(12) United States Patent
Hisano et al.

(10) Patent No.: US 10,574,430 B2
(45) Date of Patent: Feb. 25, 2020

(54) RELAY TRANSMISSION SYSTEM, RELAY TRANSMISSION METHOD, AND RELAY TRANSMISSION DEVICE

(71) Applicant: NIPPON TELEGRAPH AND TELEPHONE CORPORATION, Tokyo (JP)

(72) Inventors: Daisuke Hisano, Yokosuka (JP); Tatsuya Shimada, Yokosuka (JP); Hiroshi Ou, Yokosuka (JP); Takayuki Kobayashi, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/770,234

(22) PCT Filed: Oct. 25, 2016

(86) PCT No.: PCT/JP2016/081548
§ 371 (c)(1),
(2) Date: Apr. 23, 2018

(87) PCT Pub. No.: WO2017/073547
PCT Pub. Date: May 4, 2017

(65) Prior Publication Data
US 2018/0309563 A1    Oct. 25, 2018

(30) Foreign Application Priority Data

Oct. 29, 2015    (JP) ................................ 2015-212969

(51) Int. Cl.
*H04L 5/14* (2006.01)
*H04B 10/25* (2013.01)
(Continued)

(52) U.S. Cl.
CPC ....... *H04L 5/1469* (2013.01); *H04B 10/2503* (2013.01); *H04B 10/25753* (2013.01);
(Continued)

(58) Field of Classification Search
CPC ... H04L 5/1469; H04L 5/1423; H04L 5/0037; H04L 12/44; H04B 10/25753; H04B 10/2503; H04B 10/2971
See application file for complete search history.

(56) References Cited

U.S. PATENT DOCUMENTS

2015/0215059 A1    7/2015   Kerpez et al.

FOREIGN PATENT DOCUMENTS

JP    2013-239823 A    11/2013
JP    2015-186030 A    10/2015

OTHER PUBLICATIONS

"NTT Technical Journal, Technology Basic Course [GE-PON Technology], Part 1: PON", [online], 2005, Nippon Telegraph and Telephone Corporation, [accessed May 21, 2015], Internet <URL http://www.ntt.co.jp/journal/0508/files/jn200508071.pdf> with partial English translation thereof.
(Continued)

*Primary Examiner* — Leslie C Pascal
(74) *Attorney, Agent, or Firm* — Harness, Dickey & Pierce, P.L.C.

(57) ABSTRACT

A relay transmission system includes a relay unit configured to relay uplink signals and downlink signals in the first and second communication systems, a time division duplex (TDD) information estimation unit configured to estimate a transmission period of network devices in the first communication system on the basis of the uplink or downlink signal of the first communication system that is relayed by the relay unit, a surplus bandwidth determination unit configured to determine a surplus bandwidth in which an uplink signal of the first communication system is not allocated to a relay target of the relay unit during the transmission period on the basis of the number of network devices and a maximum transmission capacity of the network devices, and a bandwidth allocation unit configured to allocate the uplink signal (Continued)

of the second communication system to the relay target of the relay unit in the surplus bandwidth.

4 Claims, 16 Drawing Sheets

(51) Int. Cl.
  *H04B 10/2575* (2013.01)
  *H04B 10/297* (2013.01)
  *H04L 5/00* (2006.01)

(52) U.S. Cl.
  CPC ....... *H04B 10/2971* (2013.01); *H04L 5/0037* (2013.01); *H04L 5/1423* (2013.01)

(56) References Cited

OTHER PUBLICATIONS

3GPP, "Evolved Universal Terrestrial Radio Access (E-UTRA) and Evolved Universal Terrestrial Radio Access Network (E-UTRAN); Overall description; Stage 2 (Release 12)", 3GPP TS 36.300 (V12. 4.0), Dec. 2014 (5 Physical Layer for E-UTRA).

Hisano et al., A study of Accommodation of Mobile and Other systems in a PON system Using mobile TDD Frame Estimation, IEICE Society Conference 2015, B-8-10, Sep. 2015 with partial English translation thereof.

International Search Report for PCT/JP2016/081548, ISA/JP, dated Jan. 17, 2017, with English translation attached.

Antonios G. Sarigiannidis et al., "Architectures and Bandwidth Allocation Schemes for Hybrid Wireless-Optical Networks", IEEE Communications Surveys & Tutorials, vol. 17, No. 1, Mar. 16, 2015, pp. 427-468.

Panagiotis Sarigiannidis et al., "Alleviating the High Propagation Delays in FiWi Networks: A Prediction-based DBA Scheme for 10G-EPON-WiMAX Systems", 2015 International Workshop on Fiber Optics in Access Network (FOAN), IEEE, Oct. 6, 2015, pp. 45-50.

Jerome A. Arokkiam et al., "Refining the GIANT dynamic bandwidth allocation mechanism for XG-PON", 2015 IEEE International Conference on Communications (ICC), Jun. 8, 2015, pp. 1006-1011.

Extended European Search Report regarding EPSN 168597771, dated Apr. 30, 2019.

| INDEX | SWITCHING CYCLE | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

D: DOWNLINK SUBFRAME
U: UPLINK SUBFRAME
S: SPECIAL SUBFRAME

RELAY TRANSMISSION SYSTEM, RELAY TRANSMISSION METHOD, AND RELAY TRANSMISSION DEVICE

CROSS-REFERENCE TO RELATED APPLICATIONS

This application is a 371 U.S. National Stage of International Application No. PCT/JP2016/081548, filed Oct. 25, 2016, which claims the benefit of and priority to Japanese Patent Application No. 2015-212969, filed Oct. 29, 2015. The entire disclosures of the above applications are incorporated herein by reference.

TECHNICAL FIELD

The present invention relates to a relay transmission system, a relay transmission method, and a relay transmission device.

BACKGROUND ART

In wireless communication systems, an antenna unit (RRH: Remote Radio Head) and a signal processing unit (BBU: Baseband Unit) of a wireless base station may be separate. The RRH and the BBU communicate via mobile fronthaul.

FIG. 9 is a diagram showing an example of a configuration of mobile fronthaul. In the mobile fronthaul, communication of a wavelength division multiplex (WDM) scheme is used. In the WDM scheme, a wavelength of light used in an uplink is different from a wavelength of light used in a downlink. The uplink is a link from a lower-order device that is a mobile wireless terminal or the like to a higher-order device that is a BBU or the like. The downlink is a link from the higher-order device to the lower-order device. By using the WDM scheme, a relay transmission system simultaneously transmits an uplink signal and a downlink signal via a single core optical fiber (see Non-Patent Document 1).

The relay transmission system may relay a signal of a communication system based on a time division duplex (TDD) scheme according to a frequency division duplex (FDD) scheme. In the FDD scheme, different frequency bands are used for the uplink and the downlink. In the TDD scheme, the same frequency band is used for the uplink and the downlink. In the TDD scheme, the uplink signal and the downlink signal are switched on a time axis.

FIG. 10 is a diagram showing a configuration of a TDD frame of Long Term Evolution (LTE). In LTE, the TDD frame includes 10 TDD subframes. There are seven types of combinations of allocation of a downlink subframe, an uplink subframe, and a special subframe with respect to the TDD subframes. In LTE, the time length of the TDD subframe is 1 millisecond. In the TDD scheme, allocation to each TDD subframe in the TDD frame is determined in accordance with uplink and downlink traffic. The ratio between uplink and downlink communication times in the TDD frame can be flexibly changed because allocation to the TDD subframe is determined in accordance with traffic.

The special subframe (S) includes a downlink pilot time slot (DwPTS), a guard period (GP), and an uplink pilot time slot (UpPTS) (see Non-Patent Document 2). DwPTS is a time slot used for transmission of a downlink control signal. UpPTS is a time slot used for transmission of an uplink control signal. GP is a protection time for switching between an uplink signal and a downlink signal.

FIG. 11 is a diagram showing an example of bandwidth utilization of a wireless section and an optical section in mobile fronthaul when a communication line of a wireless base station of a TDD scheme is accommodated. In the wireless section, data signals are bidirectionally transmitted by performing switching between the transmission of the downlink signal and the transmission of the uplink signal on the time axis. Also, in the optical section, data signals are bidirectionally transmitted by alternately performing transmission of the uplink signal and transmission of the downlink signal on the time axis in accordance with the switching in the wireless section. Therefore, in an optical section adopting the WDM scheme, a period during which no signal is transmitted according to the TDD scheme (hereinafter referred to as a "TDD non-transmission period") on the time axis may occur. That is, the TDD non-transmission period is a signal transmission stop period of the wireless communication system. The TDD non-transmission period occurs in both the uplink and the downlink.

There is a relay transmission system configured to multiplex a signal of a mobile system and a signal of another communication system which is Fiber To The Home (FTTH) or the like during the TDD non-transmission period (see Non-Patent Document 3).

FIG. 12 is a diagram showing an example of a network system using a passive optical network (PON) in an optical section. An optical line terminal (OLT) (an optical subscriber line termination device) is an optical device configured to estimate the TDD non-transmission period on the basis of a signal transmitted from a wireless communication system via an optical fiber.

FIG. 13 is a block diagram showing an example of a configuration of the OLT. In an initial state, the OLT allocates a bandwidth to the uplink signal of the wireless communication system in a fixed manner. Hereinafter, allocating a bandwidth in a fixed manner is called "fixed bandwidth allocation (FBA)." In the initial state, the OLT stops the transmission of a signal of another communication system. A TDD frame information estimation unit estimates a configuration of a TDD subframe. That is, the TDD frame information estimation unit determines whether each TDD subframe is subframe allocated to an uplink or a downlink on the basis of an estimation result.

The TDD frame information estimation unit estimates the TDD non-transmission period on the basis of a result of estimating the configuration of the TDD subframe and a result of estimating a timing of the TDD subframe. In order to estimate the TDD non-transmission period, the TDD frame information estimation unit needs to acquire a signal of a certain amount of traffic or more which is required (hereinafter referred to as a "required amount of traffic").

The traffic monitoring unit adjusts the length of time for which the traffic of the uplink signal of the wireless communication system is monitored so that the TDD frame information estimation unit can acquire a signal having an amount of traffic greater than or equal to the required amount of traffic. Also, the traffic monitoring unit may monitor the uplink signal or the downlink signal.

The TDD frame information estimation unit notifies a timing calculation unit of TDD frame pattern information. That is, the TDD frame information estimation unit transmits the result of estimating the configuration of the TDD subframe and information indicating the timing of the TDD subframe to the timing calculation unit. The timing calculation unit calculates a timing capable of being used by the wireless communication system for signal transmission (hereinafter referred to as a "usable timing") on the basis of the TDD frame pattern information. The timing calculation unit notifies a timing indication unit of usable timing information indicating the usable timing.

The timing indication unit determines a timing to be used by the wireless communication system for signal transmission (hereinafter referred to as a "use timing") on the basis of the usable timing information. The timing indication unit notifies a downlink layer 2 switch (L2SW) of the use timing. The timing indication unit transmits the use timing to a bandwidth allocation method selection unit to switch a method in which the bandwidth allocation method selection unit allocates the bandwidth to the uplink signal.

The bandwidth allocation method selection unit allocates a bandwidth to an uplink signal of the wireless communication system according to FBA during a period in which a signal is transmitted (a transmission period) according to the TDD scheme on the time axis (hereinafter referred to as a "TDD transmission period"). The bandwidth allocation method selection unit allocates a bandwidth to a signal of another communication system according to FBA or dynamic bandwidth allocation (DBA) during the TDD non-transmission period. The bandwidth allocation method selection unit transmits information indicating a method of allocating a bandwidth (hereinafter referred to as "bandwidth allocation method information") to the bandwidth allocation unit. On the basis of the bandwidth allocation method information, the bandwidth allocation unit allocates an uplink signal of the wireless communication system to the bandwidth.

CITATION LIST

Non-Patent Document

[Non-Patent Document 1]
"NTT Technical Journal, Technology Basic Course [GE-PON Technology], Part 1: PON," [online], 2005, Nippon Telegraph and Telephone Corporation, [found on May 21, 2015], Internet <URL http://www.ntt.co.jp/journal/0508/files/jn200508071.pdf>

[Non-Patent Document 2]
3GPP, "Evolved Universal Terrestrial Radio Access (E-UTRA) and Evolved Universal Terrestrial Radio Access Network (E-UTRAN); Overall description; Stage 2 (Release 12)," 3GPP TR 36.300 (V12.4.0), 2013 (5 Physical Layer for E-UTRA)

[Non-Patent Document 3]
Hisano et al., "A Study of Accommodation of Mobile and Other Systems in a PON System using Mobile TDD Frame Estimation," Society Conference of Electronic Information Communication 2015, B-8-10, September 2015

SUMMARY OF INVENTION

Technical Problem

FIG. 14 is a flowchart showing an example of an operation of an OLT. In the initial state, the OLT allocates a bandwidth to a data signal of an uplink of the wireless communication system according to FBA. In the initial state, the OLT stops the transmission of a data signal of another communication system.

The TDD information estimation unit estimates a timing of a TDD non-transmission period on the basis of an amount of data of an uplink data signal. The TDD information estimation unit needs to acquire a data signal of a required amount of traffic to estimate the timing of the TDD non-transmission period.

The traffic monitoring unit adjusts a length of a time for which traffic of an uplink data signal of the wireless communication system is monitored so that the TDD information estimation unit can acquire a data signal of an amount of traffic greater than or equal to the required amount of traffic. Also, the traffic monitoring unit may monitor an uplink data signal or a downlink data signal.

The TDD information estimation unit determines a use timing to be used for the transmission of a data signal in the wireless communication system. The bandwidth allocation unit allocates an uplink data signal of the wireless communication system to a bandwidth on the basis of bandwidth allocation method information. The bandwidth allocation unit allocates a bandwidth to the uplink data signal of the wireless communication system during a TDD transmission period according to FBA. The bandwidth allocation unit allocates a bandwidth to a data signal of another communication system during a TDD non-transmission period according to FBA or dynamic bandwidth allocation (DBA).

FIG. 15 is a diagram showing an example of an algorithm of DBA. The horizontal axis represents time. An upper part shows an operation of DBA to be executed by the OLT. A lower part shows an operation to be executed by an optical network unit (ONU) (an optical subscriber line network device).

The ONU buffers the uplink data signal. A REPORT signal is a signal for providing a notification of an amount of data of the data signal buffered by the ONU. That is, the REPORT signal is a signal for requesting the OLT to permit the transmission of a data signal of the amount of data indicated in the notification. The ONU notifies the OLT of the amount of data of the buffered uplink data signal by using the REPORT signal. On the basis of the REPORT signal acquired from each ONU, the OLT calculates a bandwidth to be allocated to the uplink data signal. A GATE signal is a signal for notifying the ONU of a bandwidth allocated to a data signal or a control signal. The OLT determines information indicating a bandwidth allocated to an uplink data signal (hereinafter referred to as "bandwidth allocation information"). The OLT puts the bandwidth allocation information into the GATE signal. The OLT transmits the GATE signal to each ONU. The OLT uses the GATE signal to request the ONU to transmit the REPORT signal. Hereinafter, a cycle of DBA is referred to as "DBA cycle." On the basis of the GATE signal, the ONU determines a time at which the uplink data signal is transmitted and an amount of data of the uplink data signal in a DBA cycle.

The TDD information estimation unit shown in FIG. 13 estimates a configuration of a TDD subframe. On the basis of the configuration of the TDD subframe, the TDD information estimation unit determines whether the TDD subframe is allocated to an uplink or a downlink. The TDD information estimation unit estimates a start time of the TDD subframe. The TDD information estimation unit estimates a timing of a TDD non-transmission period on the basis of the start time of the TDD subframe. A time longer than or equal to the DBA cycle is required until the ONU connected to another communication system transmits the uplink data signal after the REPORT signal is transmitted.

Hereinafter, a bandwidth that is not used for the transmission of an uplink signal of either the wireless communication system or the other communication system is referred to as a "free bandwidth." Hereinafter, a period during which a free bandwidth occurs on the time axis is referred to as a "free period."

FIG. 16 is a time chart showing an example of traffic for which no free period occurs. A first row from the top shows a configuration of a TDD subframe allocated to RRH 1. A second row from the top shows a configuration of a TDD subframe allocated to RRH 2. A third row from the top shows a configuration of the TDD subframe estimated by the OLT. A fourth row from the top shows a timing at which the OLT acquires a data signal from the ONU connected to a wireless communication system for each ONU. A fifth row from the top shows a timing at which ONU 1 connected to the wireless communication system transmits a data signal according to the TDD scheme. A sixth row from the top shows a timing at which ONU 5 connected to the wireless communication system transmits a data signal according to the TDD scheme. A seventh row from the top shows a timing at which an ONU of another communication system acquires a data signal.

In the example shown in FIG. 16, a maximum transmission capacity of the OLT in the optical section is, for example, 10 Gbps. In the example shown in FIG. 16, the OLT accommodates RRHs 1 to 5 having a maximum transmission capacity of 2 Gbps. The OLT allocates an optical communication bandwidth of 2 Gbps for each ONU connected to the wireless communication system as shown in FIG. 16. In the example shown in FIG. 16, all TDD transmission periods are used. That is, in FIG. 16, no free period occurs during the TDD transmission period.

However, the wireless communication system does not necessarily use all the bandwidths during the TDD transmission period. Because the free bandwidth increases as the number of ONUs connected to the wireless communication system decreases, there is a problem in that the relay transmission system cannot improve the bandwidth utilization efficiency.

FIG. 17 is a time chart showing an example of traffic for which a free period occurs. In the example shown in FIG. 17, a maximum transmission capacity of the OLT in the optical section is, for example, 10 Gbps. In the example shown in FIG. 17, the OLT accommodates communication lines of RRH 1 and RRH 2 with a maximum transmission capacity of 2 Gbps. The OLT allocates a bandwidth of 2 Gbps to each RRH within the bandwidth of 10 Gbps which is the maximum transmission capacity. That is, the OLT allocates a bandwidth of 4 Gbps (=2 Gbps×2) within the bandwidth of 10 Gbps to the wireless communication system. The OLT allocates an optical communication bandwidth of 2 Gbps to each ONU connected to the wireless communication system as shown in FIG. 17. In the example shown in FIG. 17, a free period occurs during the TDD transmission period. In the example shown in FIG. 17, a bandwidth of 6 Gbps (=10 Gbps−4 Gbps) is a free bandwidth.

In view of the above-described circumstances, an objective of the present invention is to provide a relay transmission system, a relay transmission method, and a relay transmission device capable of improving bandwidth utilization efficiency in a relay transmission system, which accommodates a communication line of a communication system for performing communication according to TDD and a communication line of another communication system.

Solution to Problem

According to a first aspect of the present invention, there is provided a relay transmission system, which accommodates a communication line of a first communication system including a plurality of network devices for performing communication according to TDD and a communication line of a second communication system, the relay transmission system including: a relay unit configured to relay uplink signals and downlink signals in the first and second communication systems; a TDD information estimation unit configured to estimate a transmission period of the plurality of network devices in the first communication system on the basis of the uplink or downlink signal of the first communication system that is relayed by the relay unit; a surplus bandwidth determination unit configured to determine a surplus bandwidth in which an uplink signal of the first communication system is not allocated to a relay target of the relay unit during the transmission period on the basis of the number of the plurality of network devices and a maximum transmission capacity of the network device; and a bandwidth allocation unit configured to allocate an uplink signal of the second communication system to the relay target of the relay unit in the surplus bandwidth.

According to a second aspect of the present invention, in the relay transmission system of the above-described first aspect, when transmission periods in the plurality of network devices differ according to each group of the plurality of network devices, the TDD information estimation unit is further configured to estimate the transmission period for each group on the basis of the uplink or downlink signal of the first communication system that is relayed by the relay unit, and the surplus bandwidth determination unit is further configured to determine the surplus bandwidth on the basis of the number of network devices of each group and the maximum transmission capacity of the plurality of network devices.

According to a third aspect of the present invention, there is provided a relay transmission method for use in a relay transmission system, which accommodates a communication line of a first communication system including a plurality of network devices for performing communication according to TDD and a communication line of a second communication system, the relay transmission method including the steps of: relaying uplink signals and downlink signals in the first and second communication systems; estimating a transmission period of the plurality of network devices in the first communication system on the basis of the relayed uplink or downlink signal of the first communication system; determining a surplus bandwidth in which an uplink signal of the first communication system is not allocated to a relay target during the transmission period on the basis of the number of the plurality of network devices and a maximum transmission capacity of the plurality of network devices; and allocating an uplink signal of the second communication system to the relay target in the surplus bandwidth.

According to a fourth aspect of the present invention, there is provided a relay transmission device, which accommodates a communication line of a first communication system including a plurality of network devices for performing communication according to TDD and a communication line of a second communication system, the relay transmission device including: a relay unit configured to relay uplink signals and downlink signals in the first and second communication systems; a TDD information estimation unit configured to estimate a transmission period of the plurality of network devices in the first communication system on the basis of the uplink or downlink signal of the first communication system that is relayed by the relay unit; a surplus bandwidth determination unit configured to determine a surplus bandwidth in which an uplink signal of the first communication system is not allocated to a relay target of the relay unit during the transmission period on the basis of the number of the plurality of network devices and a maximum transmission capacity of the plurality of network devices; and a bandwidth allocation unit configured to allocate an uplink signal of the second communication system to the relay target of the relay unit in the surplus bandwidth.

Advantageous Effects of Invention

According to the present invention, it is possible to improve bandwidth utilization efficiency in a relay transmission system, which accommodates a communication line of a communication system for performing communication according to TDD and a communication line of another communication system.

DESCRIPTION OF EMBODIMENTS

Embodiments of the present invention will be described in detail with reference to the drawings.
(First Embodiment)

Figure 1:
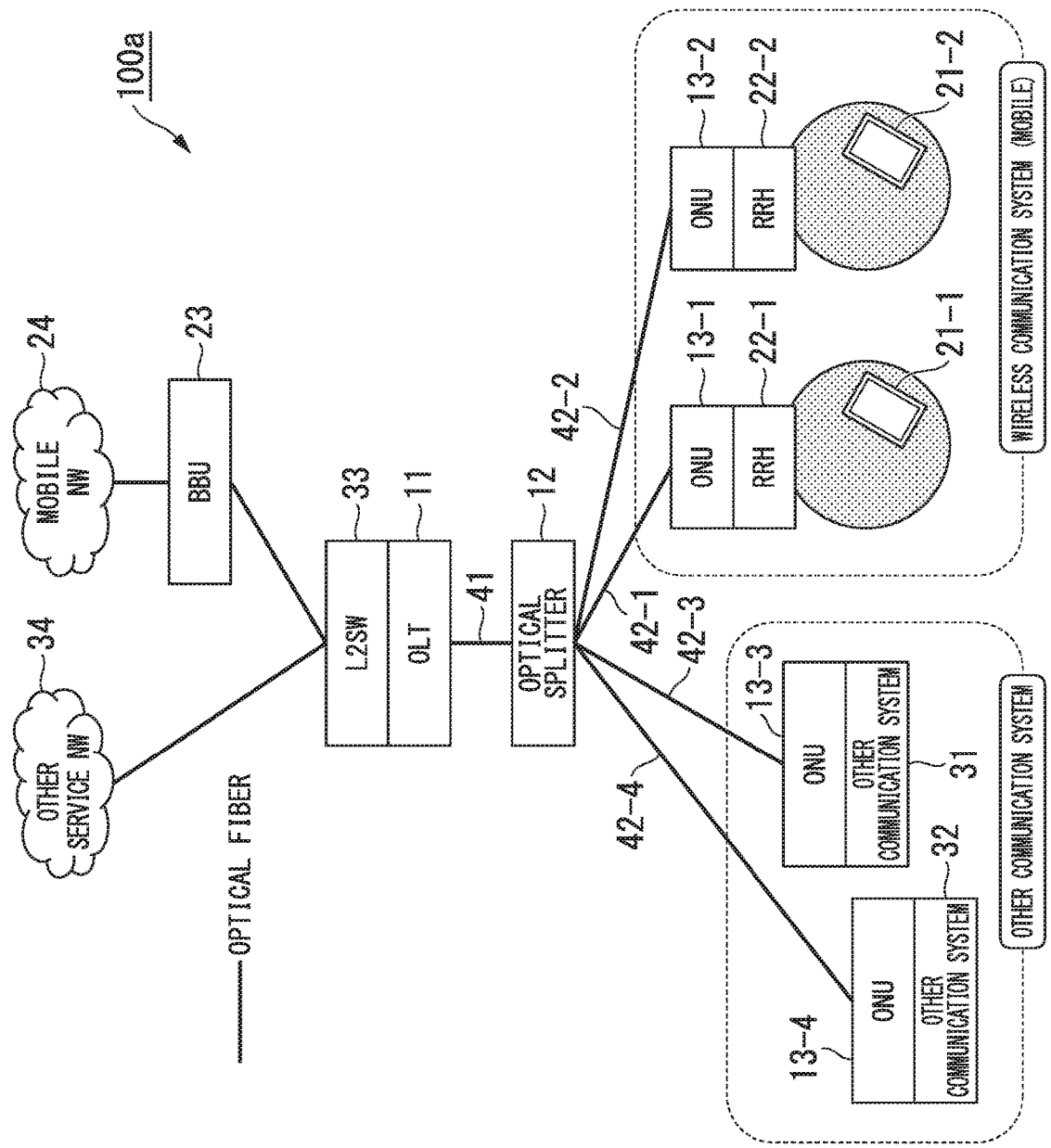
FIG. 1 is a diagram showing an example of a configuration of a network system in a first embodiment.

FIG. 1 is a diagram showing an example of a configuration of a network system 100a. The network system 100a (a relay transmission system) includes an OLT 11 (a relay transmission device), an optical splitter 12, optical network units (ONUs) 13-1 to 13-4, mobile wireless terminals 21-1 and 21-2, RRHs 22-1 and 22-2 (wireless communication systems), a BBU 23, a mobile NW 24 (a mobile network), another communication system 31, another communication system 32, a layer 2 switch (L2SW) 33, another service NW 34 (another service network), an optical fiber 41, and optical fibers 42-1 to 42-4. Hereinafter, when items common to the other communication system 31 and the other communication system 32 are described, the reference signs will be omitted and the other communication system 31 and the other communication system 32 will be referred to as the "other communication system."

In the first embodiment, the RRH 22-1 and the RRH 22-2 belong to the same group. Groups are classified on the basis of a configuration of a TDD subframe of a wireless communication system. In the first embodiment, the configuration of the TDD subframe in the RRH 22-1 is the same as the configuration of the TDD subframe in the RRH 22-2. In the first embodiment, an index indicating the configuration of the TDD subframe of the RRH 22-1 is the same as an index indicating the configuration of the TTD subframe of the RRH 22-2. The index indicating the TDD subframe configuration is the index shown in FIG. 10. Because the RRHs 22-1 and 22-2 use the same TDD subframe configuration, the configuration of the TDD subframe is also the same in the ONU 13-1 and the ONU 13-2.

Hereinafter, when items common to the ONUs 13-1 to 13-4 are described, a part of the reference sign will be omitted and the ONUs 13-1 to 13-4 will be referred to as an "ONU 13." Hereinafter, when items common to the mobile wireless terminals 21-1 and 21-2 are described, a part of the reference sign will be omitted and the mobile wireless terminals 21-1 and 21-2 will be referred to as a "mobile wireless terminal 21." Hereinafter, when items common to the RRHs 22-1 and 22-2 are described, a part of the reference sign will be omitted and the RRHs 22-1 and 22-2 will be referred to as an "RRH 22." Hereinafter, when items common to the optical fibers 42-1 to 42-4 are described, a part of the reference sign will be omitted and the optical fibers 42-1 to 42-4 will be referred to as an "optical fiber 42."

The network system 100a may include more ONUs 13. The network system 100a may include more mobile wireless terminals 21. The network system 100a may include more RRHs 22.

Hereinafter, a direction from the OLT 11 to the ONU 13 is referred to as a "downlink." Hereinafter, a direction from the ONU 13 to the OLT 11 is referred to as an "uplink." In FIG. 1, the optical section is a section from the OLT 11 to the ONU 13. The optical section is, for example, a PON. In the following, as an example, a case in which the network system 100a includes a PON will be described. A network topology of the network system 100a may have a configuration such as a link configuration or a bus configuration and is not limited to a specific topology.

The OLT 11 is an optical subscriber line termination device. The OLT 11 is a device higher than the ONU 13. For example, the OLT 11 is managed by a communication service provider. As an example, a maximum transmission capacity of the OLT 11 in the optical section is 10 Gbps. The OLT 11 relays a signal of the RRH 22. The OLT 11 receives a signal of the RRH 22-1 via the ONU 13-1, the optical fiber 42-1, the optical splitter 12, and the optical fiber 41, and relays the received signal to the BBU 23. The OLT 11 receives a signal of the RRH 22-2 via the ONU 13-2, the optical fiber 42-2, the optical splitter 12, and the optical fiber 41, and relays the received signal to the BBU 23. The OLT 11 accommodates a communication line between the RRH 22 and the BBU 23. The OLT 11 relays signals to be transmitted and received between the RRH 22 and the BBU 23.

The OLT 11 relays a signal of the other communication system 31 to the other service NW 34. The OLT 11 receives a signal of the other communication system 31 via the ONU 13-3, the optical fiber 42-3, the optical splitter 12, and the optical fiber 41, and relays the received signal to another communication system higher-order device of the other service NW 34. The OLT 11 receives a signal of the other communication system 32 via the ONU 13-4, the optical fiber 42-4, the optical splitter 12, and the optical fiber 41 and relays the received signal to another communication system higher-order device of the other service NW 34. The OLT 11 accommodates communication lines between the other communication systems 31 and 32 and the other communication system higher-order device of the other service NW 34. The OLT 11 relays signals to be transmitted and received between the other communication systems 31 and 31 and the other communication system higher-order device.

Hereinafter, the mobile wireless terminal 21-1, the mobile wireless terminal 21-2, the RRH 22-1, and the RRH 22-2 are collectively referred to as a "wireless communication system." The wireless communication system may further include the mobile wireless terminal 21 and the RRH 22. The ONU 13-1 is connected to the RRH 22-1 in one-to-one correspondence. The ONU 13-2 is connected to the RRH 22-2 in one-to-one correspondence. In other words, the ONU 13 is provided for each RRH 22.

Hereinafter, a bandwidth which is a surplus of a bandwidth allocated to the uplink signal of the wireless communication system (a bandwidth allocated to the TDD transmission period) is referred to as a "surplus bandwidth." Hereinafter, a period during which the surplus bandwidth is generated in the TDD transmission period on the time axis is referred to as a "surplus period." Therefore, the surplus period is a part of the TDD transmission period. If the surplus bandwidth is not allocated to the uplink signal of the other communication system, the surplus period may be a free period because the surplus period is not used for any communication system.

The OLT 11 determines the TDD non-transmission period and the surplus period in the uplink and the downlink of the optical section. The OLT 11 transmits a signal of the other communication system during the TDD non-transmission period of the wireless communication system. That is, the OLT 11 relays an uplink signal acquired from the other communication system during the TDD non-transmission period and the surplus period of the uplink of the optical section. The OLT 11 relays a downlink signal to the other communication system during the TDD non-transmission period and the surplus period of the downlink in the optical section.

The OLT 11 transmits a signal to and from the ONU 13 according to an FDD scheme. In the FDD scheme, different frequency bands are used for the uplink and the downlink. The OLT 11 transmits optical signals having different wavelengths in the uplink and the downlink according to a WDM scheme. The WDM scheme is a type of FDD scheme in optical transmission. In the WDM scheme, a first wavelength $\lambda 1$ and a second wavelength $\lambda 2$ of the optical signal are determined.

The OLT 11 relays the downlink signal of the mobile NW 24 to the ONU 13-1 by using an optical signal of the first wavelength $\lambda 1$ which is predetermined. The OLT 11 relays the downlink signal of the mobile NW 24 to the ONU 13-2 by using the optical signal of the first wavelength $\lambda 1$. The OLT 11 relays a downlink signal of the other service NW 34 to the ONU 13-3 by using the optical signal of the first wavelength $\lambda 1$. The OLT 11 relays a downlink signal of the other service NW 34 to the ONU 13-4 by using the optical signal of the first wavelength $\lambda 1$.

The OLT 11 relays an uplink signal of the ONU 13-1 to the mobile NW 24 by using the optical signal of the second wavelength $\lambda 2$ which is predetermined. The OLT 11 relays an uplink signal of the ONU 13-2 to the mobile NW 24 by using the optical signal of the second wavelength $\lambda 2$. The OLT 11 relays an uplink signal of the ONU 13-3 to the other service NW 34 by using the optical signal of the second wavelength $\lambda 2$. The OLT 11 relays an uplink signal of the ONU 13-4 to the other service NW 34 by using the optical signal of the second wavelength $\lambda 2$. Also, the OLT 11 may relay a signal by using an optical signal and a radio signal other than the optical signal.

The optical splitter 12 distributes an optical signal of a time division multiplex (TDM) scheme received via the optical fiber 41 to the ONUs 13-1 to 13-4. The optical splitter 12 multiplexes optical signals of a time division multiple access (TDMA) scheme received from the ONUs 13-1 to 13-4 via the optical fiber 42. The optical splitter 12 transmits a multiplexed optical signal to the OLT 11 via the optical fiber 41.

The ONU 13 is a communication device. For example, the ONU 13 is an optical subscriber line network device. For example, the ONU 13 is installed in a subscriber's home. The ONU 13-1 is connected to the RRH 22-1. The ONU 13-1 relays communication between the optical splitter 12 and the RRH 22-1. The ONU 13-2 is connected to the RRH 22-2. The ONU 13-2 relays communication between the optical splitter 12 and the RRH 22-2. The ONU 13-3 is connected to the other communication system 31. The ONU 13-3 relays communication between the optical splitter 12 and the other communication system 31. The ONU 13-4 is connected to the other communication system 32. The ONU 13-4 relays communication between the optical splitter 12 and the other communication system 32.

The mobile wireless terminal 21 performs communication according to the TDD scheme by using a radio signal of a frequency fl in the wireless section with the RRH 22.

The RRH 22 may execute uplink and downlink communication with the ONU 13 according to the TDD scheme. In the TDD scheme, the same frequency band is used in the uplink and the downlink. In the TDD scheme, signals are switched to the uplink and the downlink on a time axis. The RRH 22 performs communication according to the TDD scheme by using a radio signal of the frequency fl in the wireless section with the mobile wireless terminal 21.

The BBU 23 is a signal processing unit of the wireless base station. The BBU 23 transmits a signal acquired from the L2SW 33 to the mobile NW 24. The BBU 23 transmits a signal acquired from the mobile NW 24 to the L2SW 33.

The mobile NW 24 is a mobile communication network. The mobile NW 24 is a higher-order network for the wireless communication system. The mobile NW 24 includes a communication device. The mobile NW 24 communicates with the BBU 23.

The other communication system 31 is a communication system that is more tolerant of requirements such as a high speed and low latency than a mobile network system including the mobile wireless terminal 21, the RRH 22, the BBU 23, and the mobile NW 24.

The other communication system 32 is a communication system different from the other communication system 31. The other communication system 32 is a communication system that is more tolerant of requirements such as high speed and low delay than the mobile network system including the mobile wireless terminal 21, the RRH 22, the BBU 23, and the mobile NW 24.

The L2SW 33 transmits a signal acquired from the BBU 23 or the other service NW 34 to the OLT 11. The L2SW 33 transmits a signal acquired from the OLT 11 to the BBU 23 or the other service NW 34. For example, the L2SW 33 determines a relay destination on the basis of a media access control (MAC) address included in a signal.

The other service NW 34 includes another communication system higher-order device which is a communication device. The other service NW 34 is a higher-order network for the other communication system. The other service NW 34 communicates with the other communication system via the L2SW 33.

Figure 2:
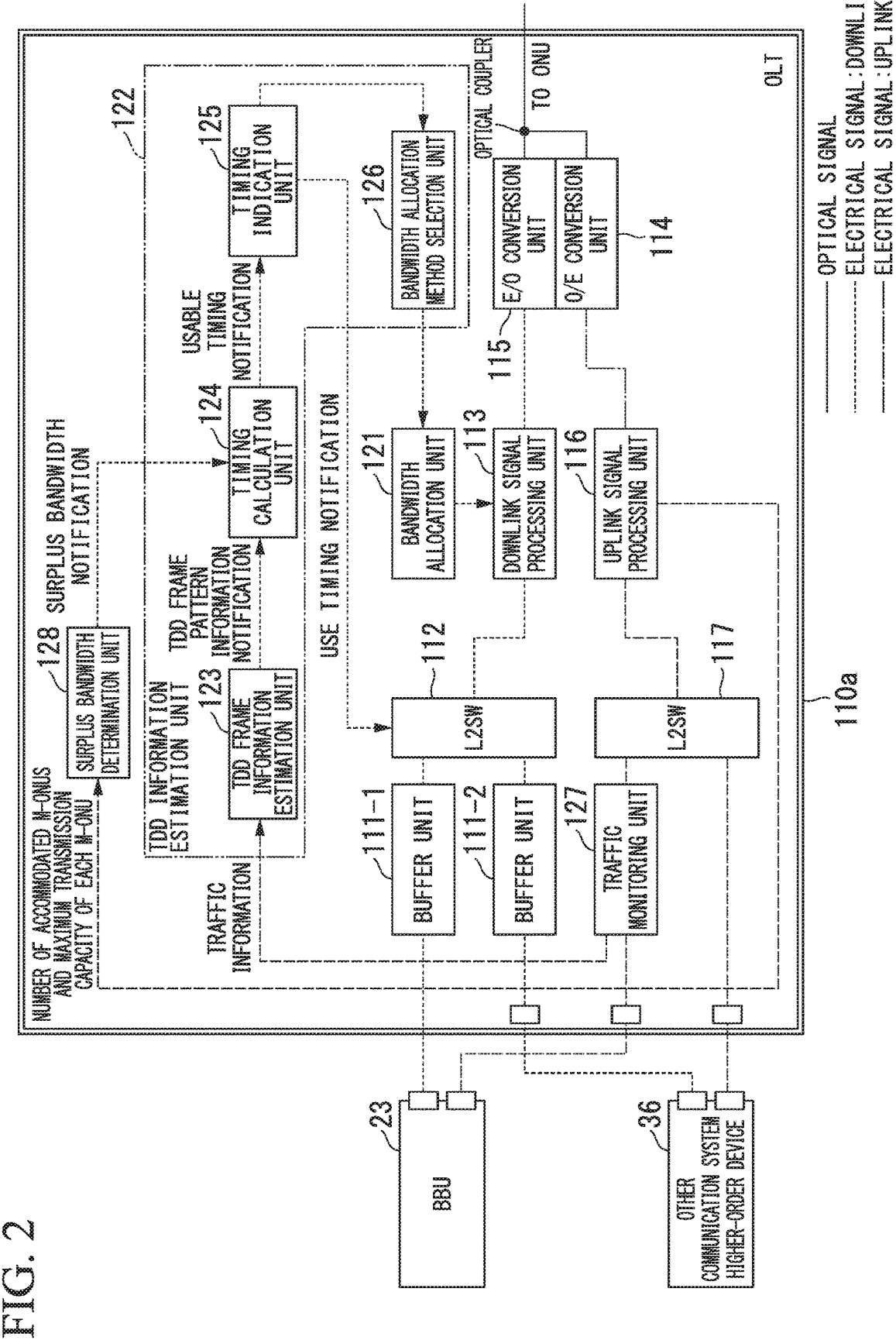
FIG. 2 is a block diagram showing an example of a configuration of an OLT in the first embodiment.

FIG. 2 is a block diagram showing an example of a configuration of an OLT 110a in the first embodiment. The OLT 110a is the OLT 11 shown in FIG. 1. Also, the OLT 110a may be an external device connected to the OLT 11.

The OLT 110a includes a buffer unit 111-1, a buffer unit 111-2, an L2SW 112, a downlink signal processing unit 113, an optical-to-electrical (O/E) conversion unit 114, an electrical-to-optical (E/O) conversion unit 115, an uplink signal processing unit 116, an L2SW 117, a bandwidth allocation unit 121, and a TDD information estimation unit 122. The TDD information estimation unit 122 includes a TDD frame information estimation unit 123, a timing calculation unit 124, a timing indication unit 125, a bandwidth allocation method selection unit 126, a traffic monitoring unit 127, and a surplus bandwidth determination unit 128.

Hereinafter, the buffer unit 111-1, the buffer unit 111-2, the L2SW 112, the downlink signal processing unit 113, the O/E conversion unit 114, the E/O conversion unit 115, the uplink signal processing unit 116, and the L2SW 117 are collectively referred to as a "relay unit."

For example, some or all of the relay unit, the bandwidth allocation unit 121, the TDD information estimation unit 122, the traffic monitoring unit 127, and the surplus bandwidth determination unit 128 may be software functional units which function when a processor such as a central processing unit (CPU) executes a program stored in a memory. Also, some or all of these functional units may be hardware functional units (circuits) such as a large scale integration circuit (LSI) and an application specific integrated circuit (ASIC).

The buffer unit 111-1 acquires a downlink signal from the BBU 23. The buffer unit 111-1 temporarily stores the downlink signal. The buffer unit 111-1 transmits the downlink signal to the L2SW 112.

The buffer unit 111-2 acquires a downlink signal from the other communication system higher-order device 36. The buffer unit 111-2 temporarily stores the downlink signal. The buffer unit 111-2 transmits the downlink signal to the L2SW 112.

In accordance with a control signal, the L2SW 112 acquires a downlink signal from the buffer unit 111-1 or the buffer unit 111-2. The L2SW 112 transmits the downlink signal to the downlink signal processing unit 113.

The downlink signal processing unit 113 acquires information indicating a bandwidth to be allocated to the uplink signal (hereinafter referred to as "bandwidth allocation information") from the bandwidth allocation unit 121. The downlink signal processing unit 113 converts the downlink signal acquired from the L2SW 112 into a frame for use in the PON. For example, the downlink signal processing unit 113 may generate a GATE signal including the bandwidth allocation information. The downlink signal processing unit 113 transmits the bandwidth allocation information to the E/O conversion unit 115.

The E/O conversion unit 115 converts a downlink signal (an electrical signal) converted into a frame by the downlink signal processing unit 113 into an optical signal of a wavelength λ1. The E/O conversion unit 115 transmits the optical signal of the first wavelength λ1 to the optical fiber 41 via an optical coupler. The optical signal is transmitted to the ONUs 13 via the optical fiber 41 and the optical fibers 42.

The O/E conversion unit 114 acquires an optical signal of the second wavelength λ2 from the ONU 13 via the optical fiber 42, the optical splitter 12, and the optical fiber 41. The O/E conversion unit 114 converts the received optical signal into an electrical signal. The O/E conversion unit 114 transmits the electrical signal to the uplink signal processing unit 116.

The uplink signal processing unit 116 converts the electrical signal acquired from the O/E conversion unit 114 into a signal according to the uplink signal. The uplink signal processing unit 116 transmits the converted uplink signal to the L2SW 117.

The number of ONUs 13 connected to the OLT 110a and the wireless communication system (the number of accommodated M-ONUs) and the maximum transmission capacity of each ONU 13 connected to the OLT 110a and the wireless communication system (the maximum bandwidth to be used) are predetermined according to a contract or the like related to the communication line.

The uplink signal processing unit 116 (a maximum transmission capacity determination unit) acquires information indicating the maximum transmission capacity of each ONU 13 connected to the OLT 110a and the wireless communication system (the maximum transmission capacity of each M-ONU). The maximum transmission capacity of each ONU 13 connected to the wireless communication system may be a value predetermined according to the contract of the communication line. The uplink signal processing unit 116 transmits information indicating the maximum transmission capacity of each ONU 13 connected to the OLT 110a and the wireless communication system to the surplus bandwidth determination unit 128.

The uplink signal processing unit 116 (an accommodation number determination unit) transmits information indicating the number of ONUs 13 (the number of accommodated M-ONUs) connected to the OLT 110a and the wireless communication system to the surplus bandwidth determination unit 128. The number of ONUs 13 connected to the wireless communication system may be a value predetermined according to the contract of the communication line.

In place of the uplink signal processing unit 116, the downlink signal processing unit 113 (a maximum transmission capacity determination unit) may acquire information indicating the maximum transmission capacity of each ONU 13 connected to the OLT 110a and the wireless communication system (the maximum transmission capacity of each M-ONU) on the basis of the downlink signal. In place of the uplink signal processing unit 116, the downlink signal processing unit 113 (an accommodation number determination unit) may transmit information indicating the number of ONUs 13 (the number of accommodated M-ONUs) connected to the OLT 110a and the wireless communication system to the surplus bandwidth determination unit 128.

The L2SW 117 acquires an uplink signal from the uplink signal processing unit 116. The L2SW 117 transmits the uplink signal to the BBU 23 or the other communication system higher-order device 36 in accordance with a destination of the uplink signal.

The surplus bandwidth determination unit 128 acquires information indicating the number of ONUs 13 connected to the OLT 110a and the wireless communication system from the uplink signal processing unit 116. The surplus bandwidth determination unit 128 acquires information indicating the maximum transmission capacity of each ONU 13 connected to the OLT 110a and the wireless communication system from the uplink signal processing unit 116.

The surplus bandwidth determination unit 128 determines a surplus bandwidth on the basis of the number of ONUs 13 (the number of accommodated M-ONUs) connected to the OLT 110a and the wireless communication system and the maximum transmission capacity of each ONU 13 connected to the OLT 110a and the wireless communication system (the maximum transmission capacity of each M-ONU). The surplus bandwidth is not allocated to the uplink signal of the other communication system in the initial state. The surplus bandwidth is represented by Equation (1). For ease of description, an overhead time caused by on/off of a laser in the optical section, encoding, or the like is not considered.

[Math. 1]

$$B_{odd} = B_{opt} - \sum_{i=1}^{n} B_{radio}^{(i)} \quad (1)$$

$B_{odd}$ indicates a surplus bandwidth. $B_{opt}$ indicates a bandwidth (a total bandwidth) allocated to the maximum transmission capacity of the OLT 110a in the optical section. $B_{radio}$ indicates a bandwidth allocated to the maximum transmission capacity of the ONU 13 connected to the OLT 110a and the wireless communication system (the maximum transmission capacity of each M-ONU). n indicates the number of ONUs 13 (the number of accommodated M-ONUs) connected to the OLT 110a and the wireless communication system. Therefore, n represents the number of RRHs 22 (the number of accommodated RRHs 22) of the wireless communication system. The surplus bandwidth determination unit 128 transmits information indicating the surplus bandwidth to the timing calculation unit 124.

The traffic monitoring unit 127 monitors the uplink signal of the wireless communication system. For example, the traffic monitoring unit 127 transmits an uplink signal (hereinafter referred to as "traffic information") of the wireless communication system to the TDD frame information estimation unit 123. For example, the traffic monitoring unit 127 may transmit information indicating an amount of data of the uplink signal of the wireless communication system to the TDD frame information estimation unit 123.

The TDD frame information estimation unit 123 estimates the configuration of the TDD subframe in the uplink signal of the wireless communication system on the basis of the uplink signal (traffic information) of the wireless communication system. Hereinafter, information indicating the configuration of the estimated TDD subframe is referred to as TDD frame pattern information. The TDD frame information estimation unit 123 may estimate the configuration of the TDD subframe of the wireless communication system on the basis of at least one of the uplink signal and the downlink signal of the wireless communication system.

The TDD frame information estimation unit 123 estimates a transmission start timing of the TDD subframe on the basis of a break of the configuration of the TDD subframe. The TDD frame information estimation unit 123 transmits TDD frame pattern information to the timing calculation unit 124.

The timing calculation unit 124 acquires the TDD frame pattern information from the TDD frame information estimation unit 123. The timing calculation unit 124 acquires information indicating the surplus bandwidth from the surplus bandwidth determination unit 128.

The timing calculation unit 124 calculates a timing capable of being used for transmission of the uplink signal of the wireless communication system (a usable timing of the wireless communication system) on the basis of the TDD frame pattern information. That is, the timing calculation unit 124 determines a TDD transmission period on the basis of the TDD frame pattern information. The timing calculation unit 124 determines a period other than the TDD transmission period as a TDD non-transmission period.

The timing calculation unit 124 determines a surplus period. The timing calculation unit 124 defines the TDD non-transmission period and the surplus period as a timing to be used for transmission of the uplink signal of the other communication system (a usable timing of the other communication system). That is, the timing calculation unit 124 determines a transmission capacity for each other communication system on the basis of the TDD non-transmission period and the surplus period.

The timing calculation unit 124 notifies the timing indication unit 125 of first usable timing information indicating a timing at which the wireless communication system can be used for signal transmission. The timing calculation unit 124 notifies the timing indication unit 125 of second usable timing information indicating a timing at which the other communication system can be used for signal transmission.

On the basis of the first usable timing information, the timing indication unit 125 determines a timing at which the ONU 13 connected to the wireless communication system is used for signal transmission. On the basis of the second usable timing information, the timing indication unit 125 determines a timing at which the ONU 13 of the other communication system is used for signal transmission.

The timing indication unit 125 notifies the downlink L2SW 112 and the bandwidth allocation method selection unit 126 of information indicating the timing at which the ONU 13 connected to the wireless communication system is used for signal transmission. The timing indication unit 125 notifies the downlink L2SW 112 and the bandwidth allocation method selection unit 126 of information indicating the timing at which the ONU 13 connected to the other communication system is used for signal transmission.

The bandwidth allocation method selection unit 126 selects either FBA or DBA serving as a method of allocating a bandwidth to the uplink signal of the wireless communication system on the basis of the information indicating the timing at which the ONU 13 connected to the wireless communication system is used for signal transmission. For example, the bandwidth allocation method selection unit 126 allocates a bandwidth of the TDD transmission period to the uplink signal of the wireless communication system according to FBA.

The bandwidth allocation method selection unit 126 selects FBA or DBA serving as a method of allocating a bandwidth to the uplink signal of the other communication system on the basis of the information indicating the timing at which the ONU 13 of the other communication system is used for signal transmission.

The bandwidth allocation method selection unit 126 selects a method of allocating a bandwidth to the uplink signal of the wireless communication system in accordance with the timing at which the ONU 13 connected to the wireless communication system is used for signal transmission. The bandwidth allocation method selection unit 126 selects a method of allocating a bandwidth to the uplink signal of the other communication system in accordance with the timing at which the ONU 13 of the other communication system is used for signal transmission. The bandwidth allocation method selection unit 126 transmits bandwidth allocation method information indicating a method of allocating a bandwidth to the bandwidth allocation unit 121.

On the basis of the bandwidth allocation method information, the bandwidth allocation unit 121 allocates an uplink signal of the wireless communication system to the bandwidth. The bandwidth allocation unit 121 transmits the bandwidth allocation information to the ONU 13 via the downlink signal processing unit 113.

For example, the bandwidth allocation unit 121 allocates a bandwidth of 2 Gbps, which is the maximum transmission capacity of the RRH 22-1, within the bandwidth $B_{opt}$ capable of being allocated to the uplink signal of the maximum transmission capacity of the OLT 110a to an uplink signal of the RRH 22-1. For example, the bandwidth allocation unit 121 allocates a bandwidth of 2 Gbps, which is the maximum transmission capacity of the RRH 22-2, within the bandwidth $B_{opt}$ capable of being allocated to the uplink signal of the maximum transmission capacity of the OLT 110a to an uplink signal of the RRH 22-2.

For example, the bandwidth allocation unit 121 allocates a bandwidth during the TDD non-transmission period to uplink signals of the other communication system 31 and the other communication system 32. That is, the bandwidth allocation unit 121 allocates a bandwidth during the TDD non-transmission period to uplink signals of the ONU 13-3 and the ONU 13-4.

The bandwidth allocation unit 121 further allocates a surplus bandwidth of 6 Gbps (=10 Gbps−2 Gbps−2 Gbps), which is not allocated to either of the uplink signals of the RRHs 22-1 and 22-2, within the bandwidth $B_{opt}$ capable of being allocated to the uplink signal of the maximum transmission capacity of the OLT 110a to the uplink signals of the other communication system 31 and the other communication system 32. That is, the bandwidth allocation unit 121 further allocates a surplus bandwidth of 6 Gbps, which is not allocated to either of the uplink signals of the RRHs 22-1 and 22-2, within the bandwidth $B_{opt}$ capable of being allocated to the uplink signal of the maximum transmission capacity of the OLT 110a to the uplink signals of ONUs 13-3 and 13-4.

Figure 3:
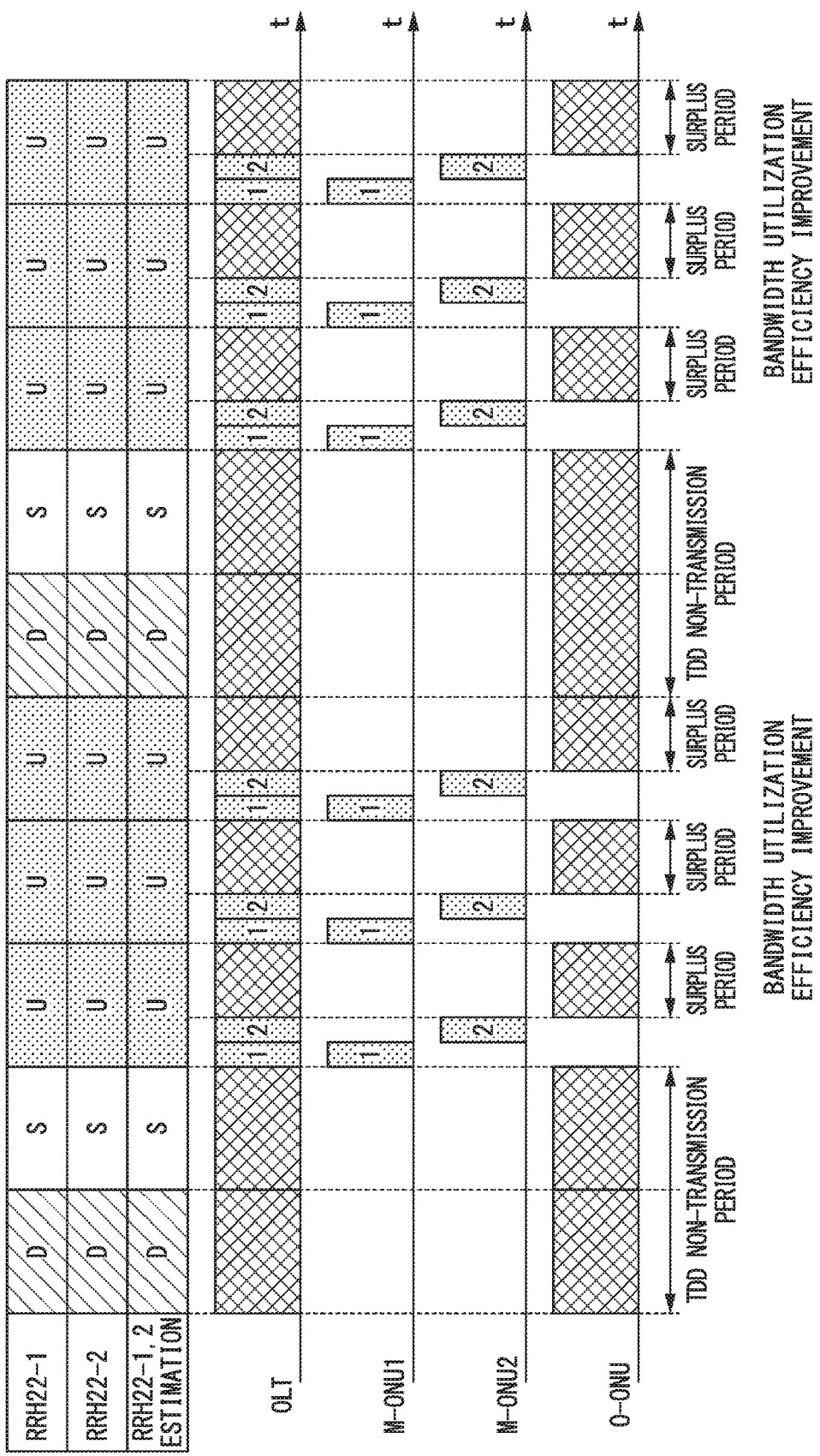
FIG. 3 is a time chart showing a first example of traffic in the first embodiment.

FIG. 3 is a time chart showing a first example of traffic in the first embodiment. The horizontal axis represents time. M-ONU 1 shown in FIG. 3 is the ONU 13-1 shown in FIG. 1. M-ONU 2 shown in FIG. 3 is the ONU 13-2 shown in FIG. 1. An O-ONU shown in FIG. 3 includes the ONU 13-3 and the ONU 13-4 shown in FIG. 1.

Figures 9, 10:
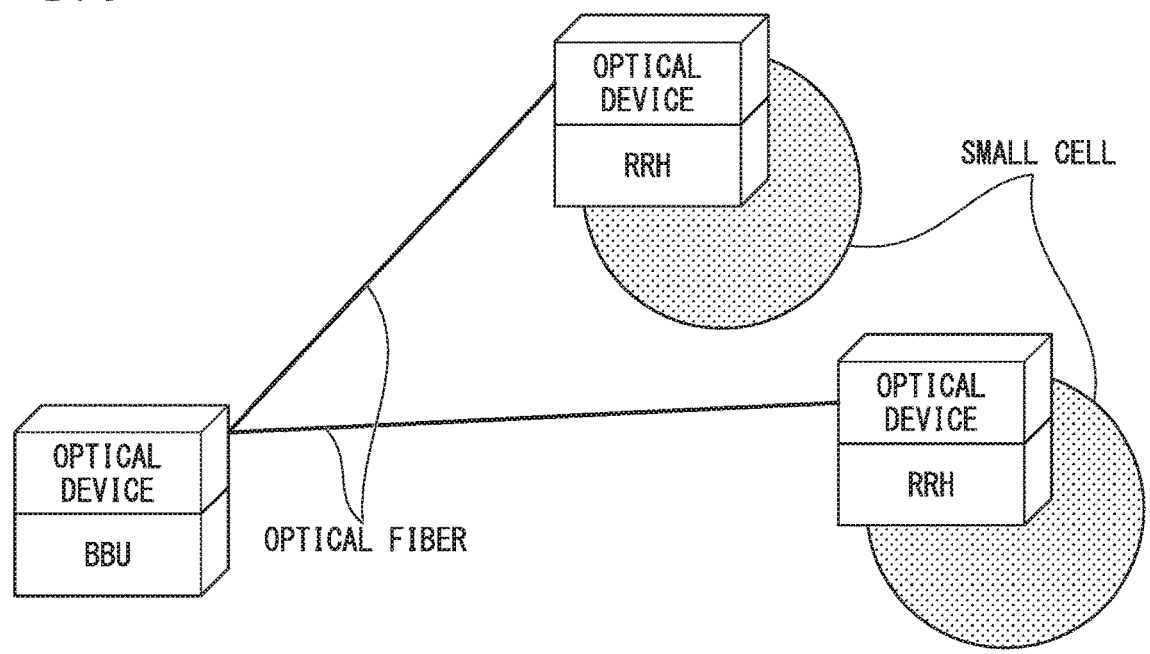
FIG. 9 is a diagram showing an example of a configuration of mobile fronthaul in the conventional technology.
FIG. 10 is a diagram showing a TDD frame of LTE in the conventional technology.
Figure 11:
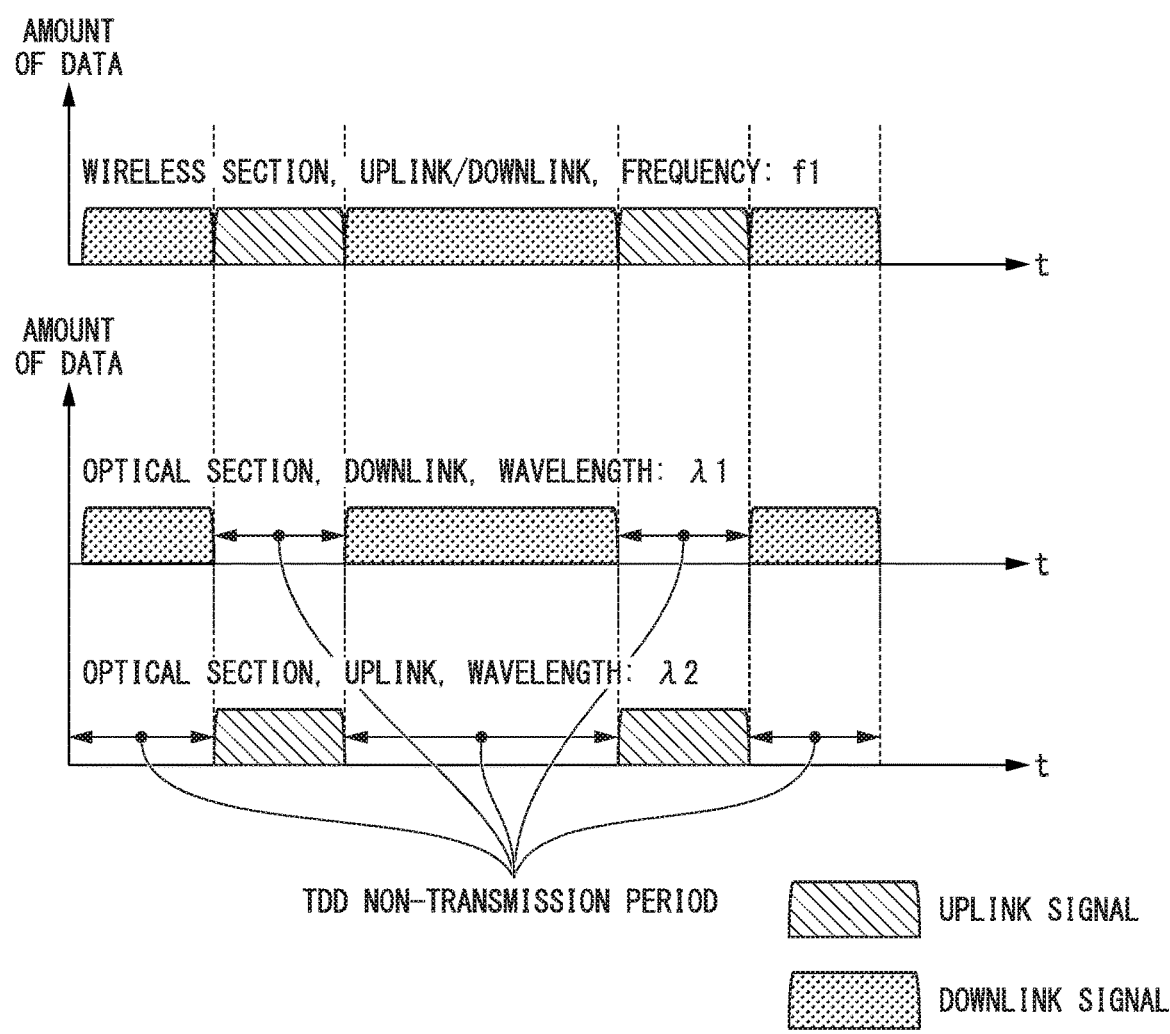
FIG. 11 is a diagram showing an example of bandwidth utilization in a wireless section and an optical section in mobile fronthaul when a communication line of a wireless base station of a TDD scheme is accommodated in the conventional technology.
Figure 12:
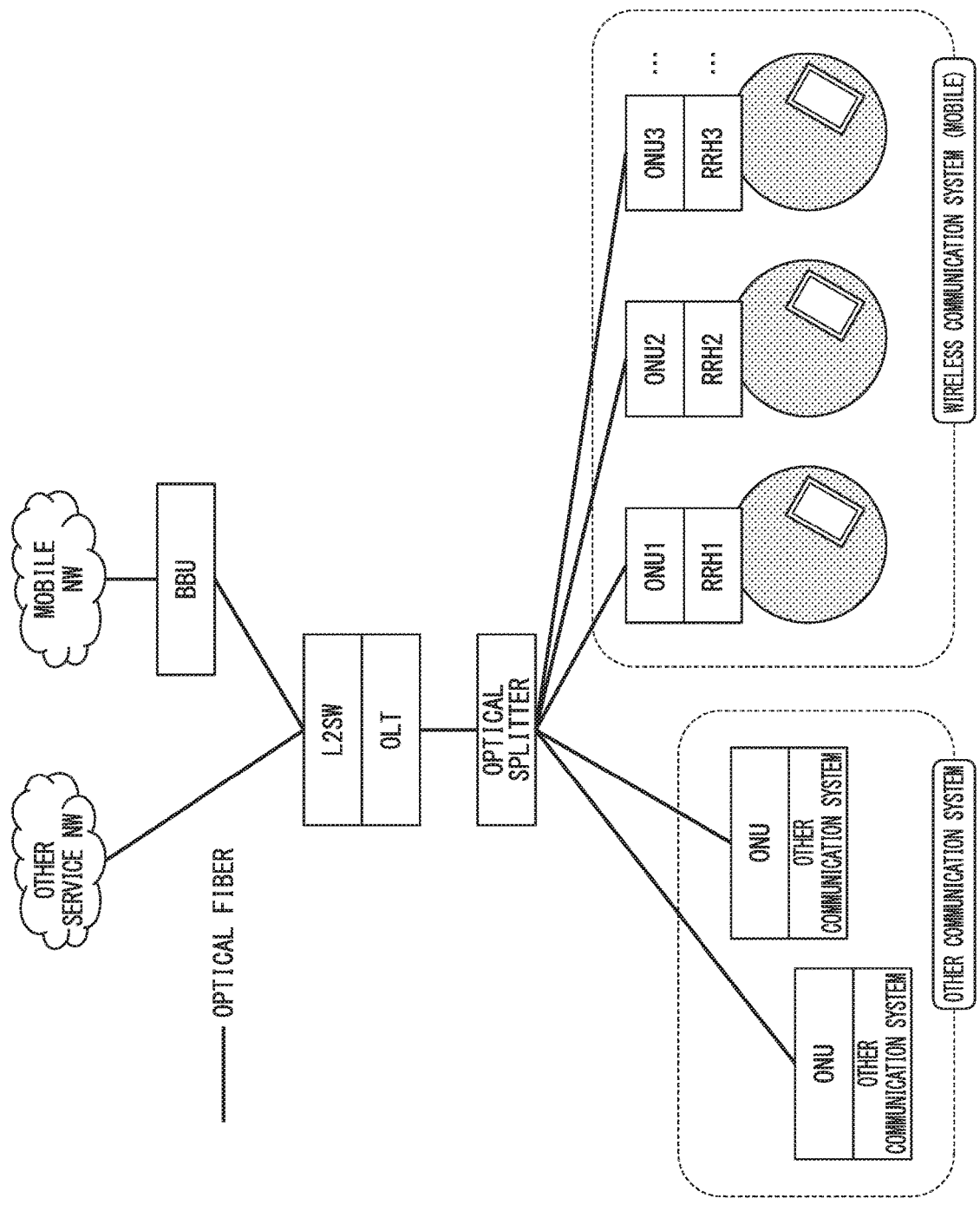
FIG. 12 is a diagram showing an example of a network system using a PON in the optical section in the conventional technology.
Figure 13:
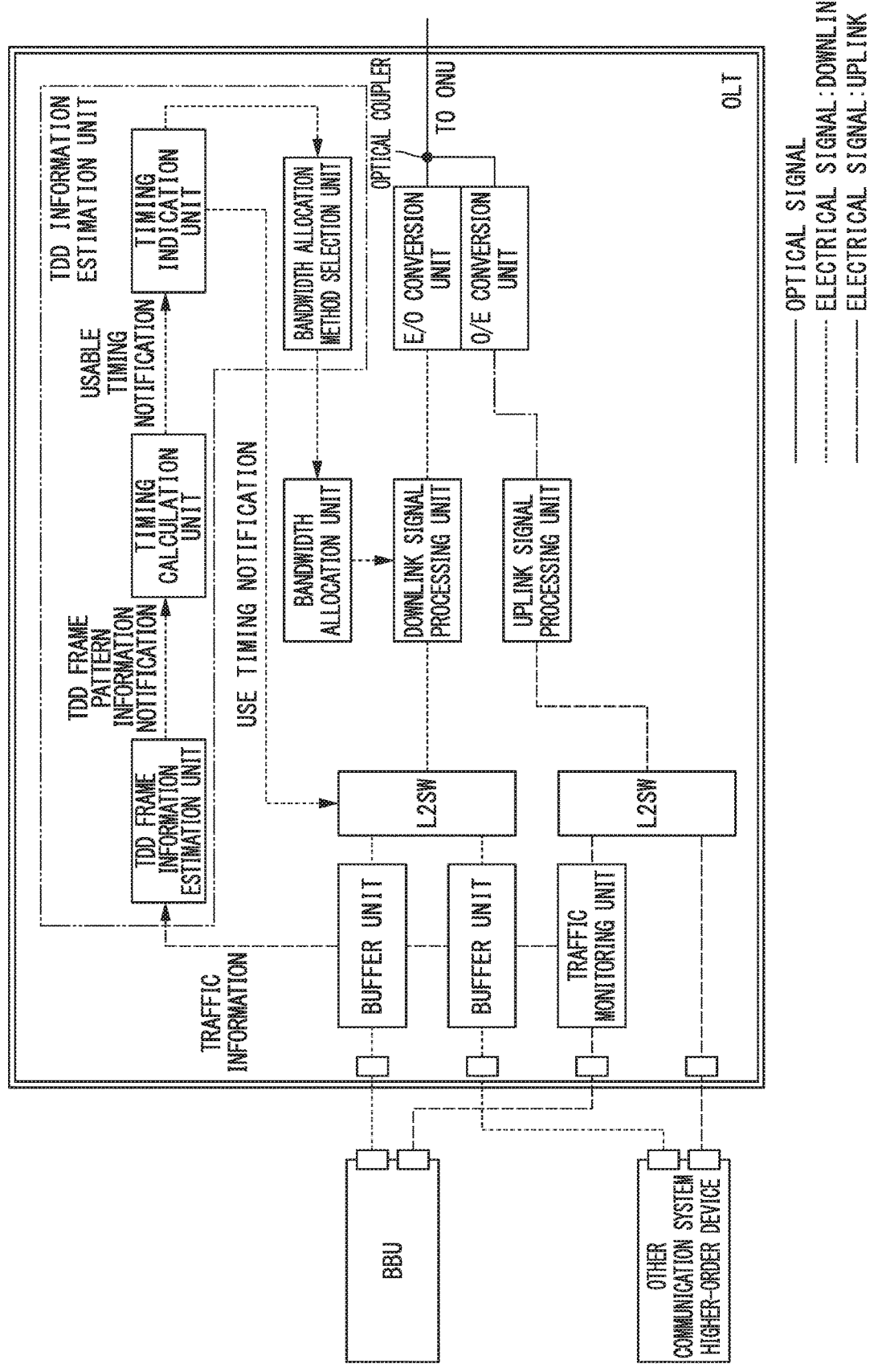
FIG. 13 is a block diagram showing an example of a configuration of an OLT in the conventional technology.
Figure 14:
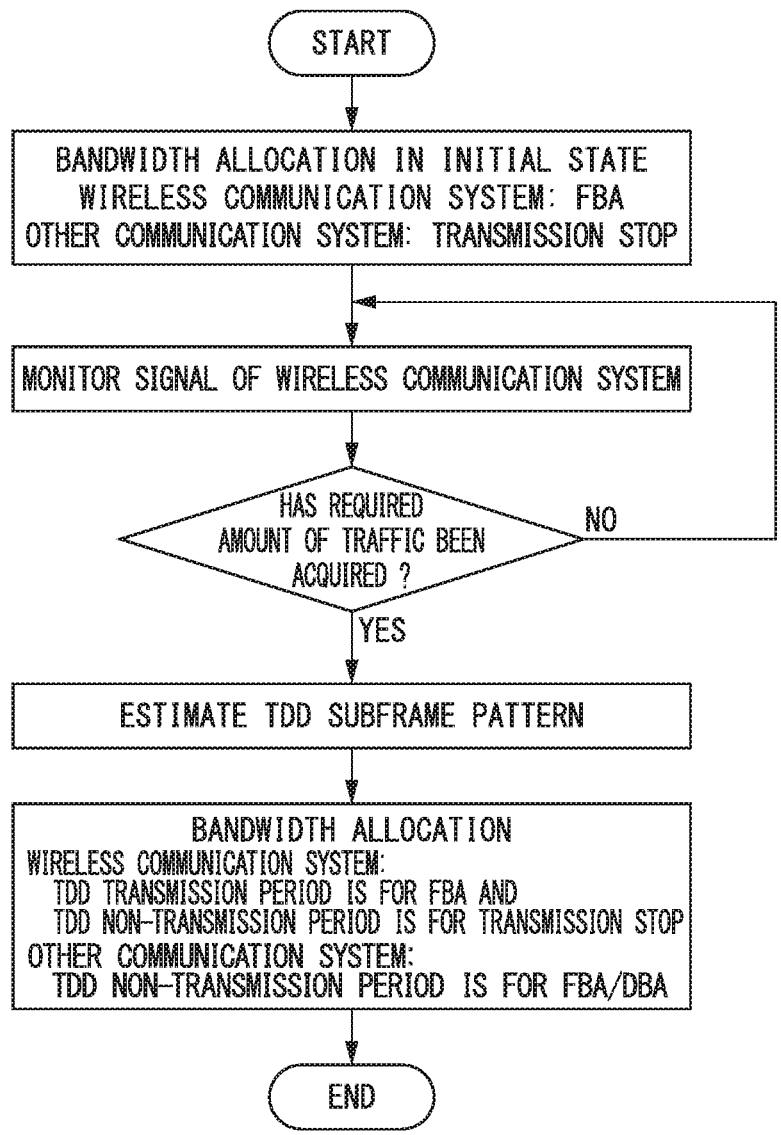
FIG. 14 is a flowchart showing an example of an operation of the OLT in the conventional technology.
Figure 15:
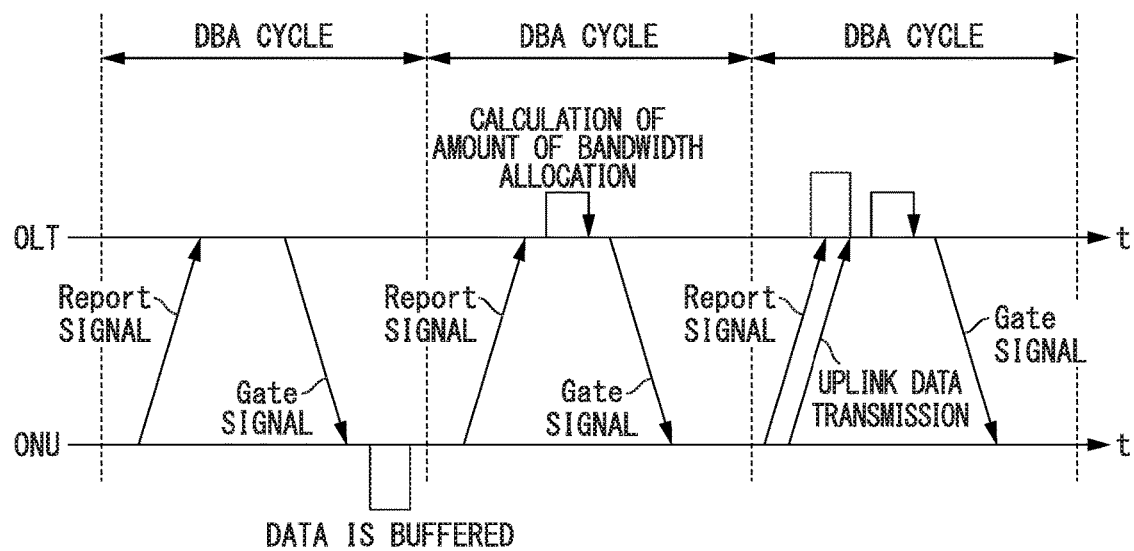
FIG. 15 is a diagram showing an example of an algorithm of DBA in the conventional technology.
Figure 16:
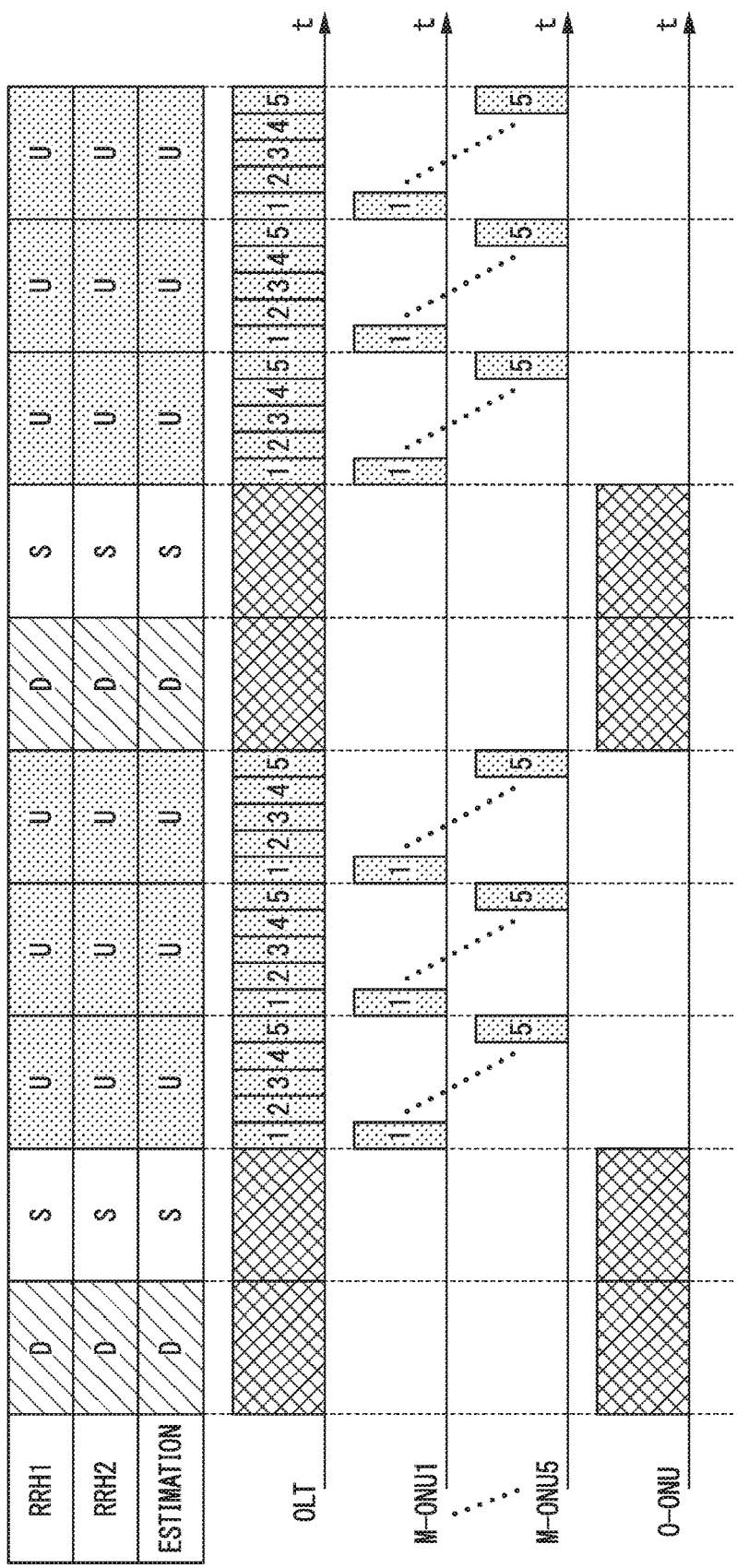
FIG. 16 is a time chart showing an example of traffic for which no free period occurs in the conventional technology.
Figure 17:
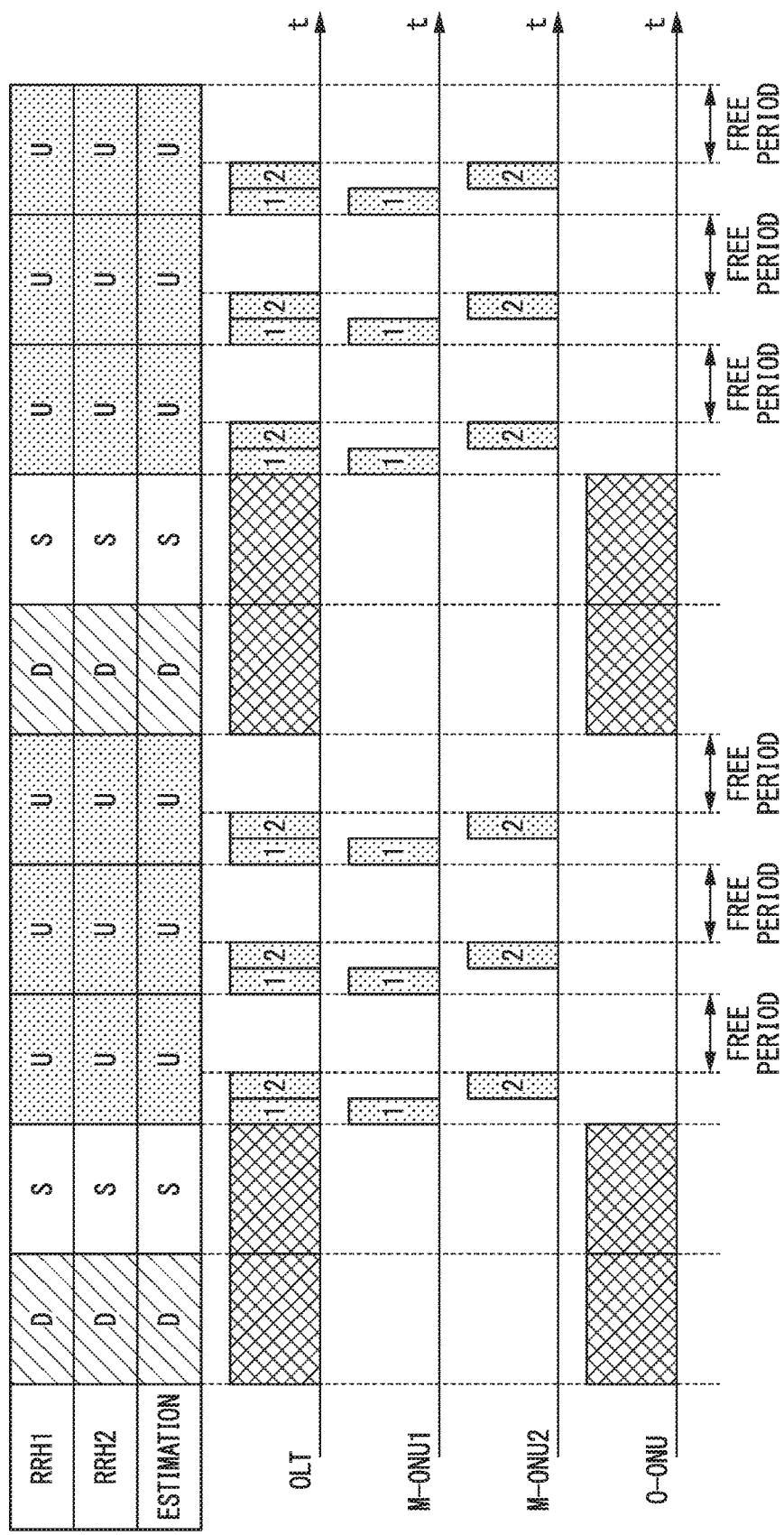
FIG. 17 is a time chart showing an example of traffic for which a free period occurs in the conventional technology.

A first row from the top shows a type of TDD subframe allocated to the signal of RRH 22-1. A configuration of a TDD frame of an index "0" shown in FIG. 10 is allocated to the RRH 22-1. A second row from the top shows a type of TDD subframe allocated to the signal of the RRH 22-2. The configuration of the TDD frame of the index "0" shown in FIG. 10 is allocated to the RRH 22-2. A third row from the top shows a result of estimating types of TDD subframes allocated to the signals of the RRHs 22-1 and 22-2. A fourth row from the top shows a timing at which the OLT 110a acquires a signal. A fifth row from the top shows a timing at which the ONU 13-1 (M-ONU 1) transmits a signal. A sixth row from the top shows a timing at which the ONU 13-2 (M-ONU 2) transmits a signal.

A seventh row from the top shows a timing at which the ONU 13-3 or the ONU 13-4 (the O-ONU) transmits a signal. In FIG. 3, the bandwidth allocation unit 121 allocates a surplus bandwidth of 6 Gbps, which is not allocated to either of the uplink signals of the ONUs 13-1 and 13-2, within the bandwidth $B_{opt}$ capable of being allocated to the uplink signal of the maximum transmission capacity of the OLT 110a to uplink signals of the ONU 13-3 and the ONU 13-4. The ONUs 13-3 and 13-4 transmit uplink signals to the OLT 110a during the TDD non-transmission period and the surplus period.

Figure 4:
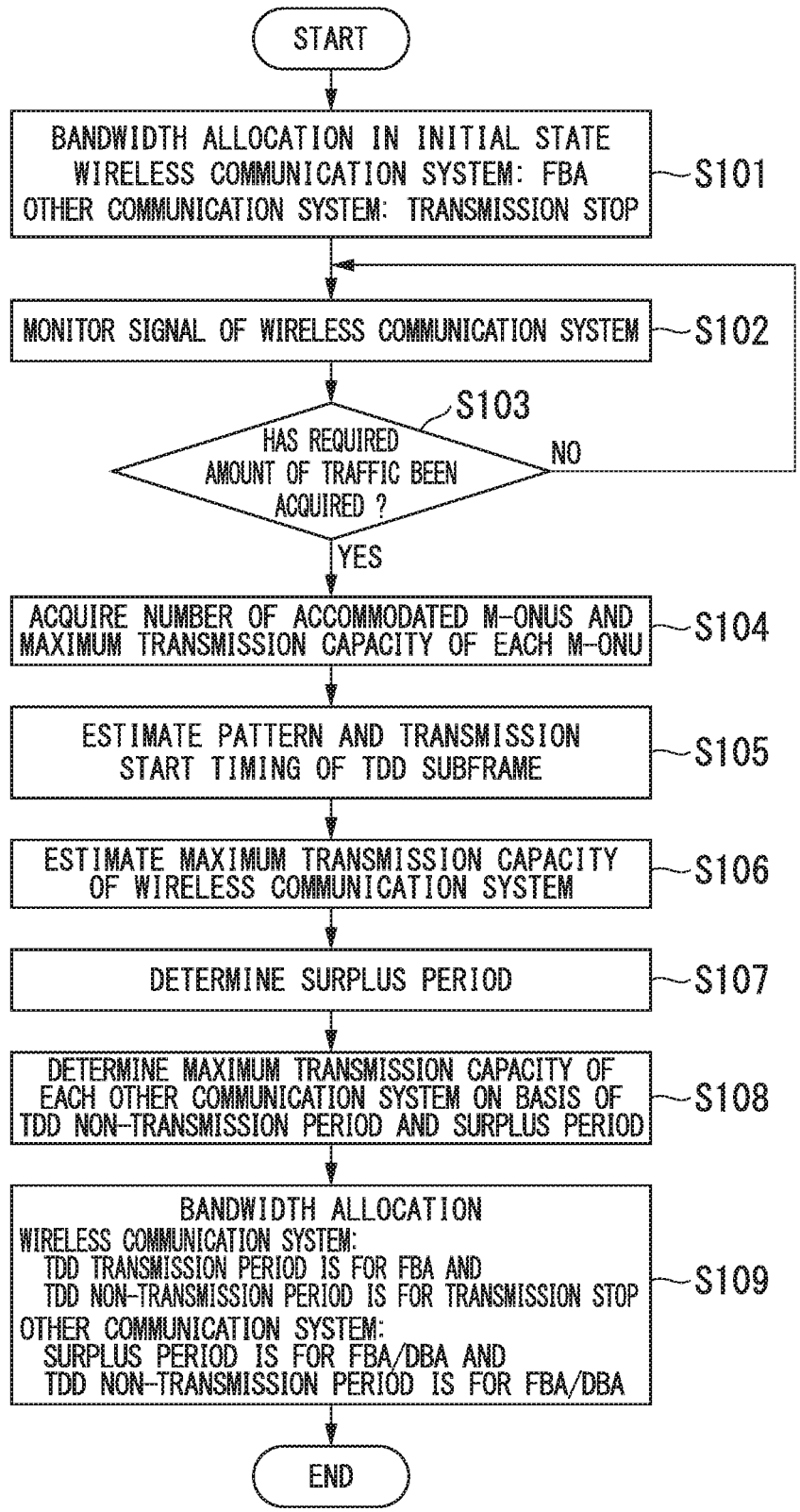
FIG. 4 is a flowchart showing an example of an operation of the OLT in the first embodiment.

FIG. 4 is a flowchart showing an example of an operation of the OLT 110a in the first embodiment. The bandwidth allocation unit 121 transmits bandwidth allocation information to the ONU 13 via the downlink signal processing unit 113. In the initial state, the bandwidth allocation unit 121 allocates a bandwidth to an uplink signal of a wireless communication system according to FBA. In the initial state, the bandwidth allocation unit 121 stops the transmission of a signal of another communication system (step S101). The traffic monitoring unit 127 monitors the uplink signal of the wireless communication system (step S102).

The TDD frame information estimation unit 123 determines whether or not a signal having a required amount of traffic or more has been acquired (step S103). If the TDD frame information estimation unit 123 has not acquired a signal having a required amount of traffic or more (step S103: NO), the TDD frame information estimation unit 123 returns the process to step S102.

When the TDD frame information estimation unit 123 has acquired a signal having a required amount of traffic or more (step S103: YES), the surplus bandwidth determination unit 128 acquires information indicating the number of ONUs 13 connected to the OLT 110a and the wireless communication system (the number of accommodated M-ONUs) from the uplink signal processing unit 116. The surplus bandwidth determination unit 128 acquires information indicating a maximum transmission capacity of each ONU 13 of the wireless communication system from the uplink signal processing unit 116 (step S104).

The TDD frame information estimation unit 123 estimates a pattern of a configuration of a TDD subframe and a transmission start timing of the TDD subframe (step S105). The uplink signal processing unit 116 estimates the maximum transmission capacity of each ONU 13 of the wireless communication system (step S106).

The timing calculation unit 124 acquires information indicating a surplus bandwidth from the TDD frame information estimation unit 123. The timing calculation unit 124 determines a surplus period (step S107). The timing calculation unit 124 determines the maximum transmission capacity for each other communication system on the basis of the TDD non-transmission period and the surplus period (step S108).

During the TDD transmission period, the bandwidth allocation unit 121 allocates a bandwidth to the signal of the wireless communication system according to FBA. During the TDD non-transmission period, the bandwidth allocation unit 121 does not allocate a bandwidth to the signal of the wireless communication system. That is, the bandwidth allocation unit 121 stops the transmission of the signal of the wireless communication system during the TDD non-transmission period.

During the surplus period defined in the TDD transmission period, the bandwidth allocation section 121 allocates a bandwidth to the uplink signal of the other communication system according to FBA or DBA. During the TDD non-transmission period, the bandwidth allocation unit 121 allocates a bandwidth to the uplink signal of the other communication system according to FBA or DBA (step S109).

As described above, a network system 100a of the first embodiment is a relay transmission system, which accommodates a communication line of a wireless communication system including a plurality of RRHs 22 for performing communication according to TDD and a communication line of another communication system different from the wireless communication system. The network system 100a includes the relay unit, the TDD information estimation unit 122, the surplus bandwidth determination unit 128, the bandwidth allocation unit 121, the ONU 13-3 (the communication device), and the ONU 13-4 (the communication device). The relay unit relays uplink signals and downlink signals in the wireless communication system and the other communication. The TDD information estimation unit 122 estimates a timing of the TDD transmission period on the basis of the signal relayed by the relay unit. The surplus bandwidth determination unit 128 determines a surplus bandwidth on the basis of the number of RRHs 22 of the wireless communication system or the number of ONUs 13 connected to the wireless communication system and a maximum transmission capacity of the RRH 22 of the wireless communication system or a maximum transmission capacity of the ONU 13 connected to the wireless communication system. During the TDD transmission period, the bandwidth allocation unit 121 allocates a surplus bandwidth in which the uplink signal of the wireless communication system is not allocated as a relay target to the uplink signal of the other communication system. The ONU 13-3 and the ONU 13-4 transmit the uplink signal of the other communication system on the basis of the bandwidth allocation by the bandwidth allocation unit 121.

Thereby, even when the number of ONUs 13 connected to the OLT 110a and the wireless communication system is small, the network system 100a (the relay transmission system) of the first embodiment can improve bandwidth utilization efficiency.

(Second Embodiment)

A second embodiment is different from the first embodiment in that an RRH 22-1 and an RRH 22-2 belong to different groups. That is, a configuration of a TDD subframe of the RRH 22-1 is different from a configuration of a TTD subframe of the RRH 22-2. In the second embodiment, only differences from the first embodiment will be described.

Figure 5:
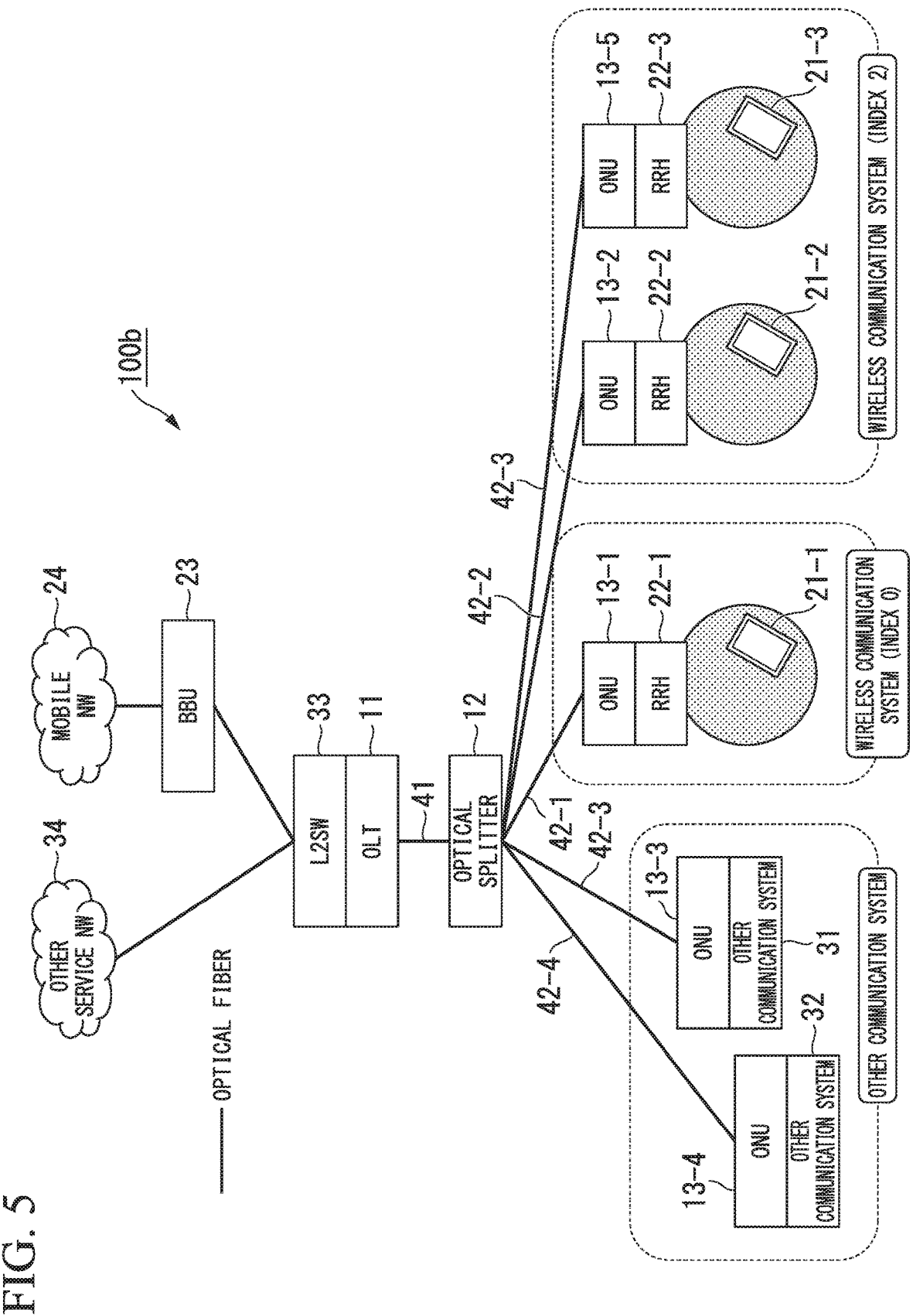
FIG. 5 is a diagram showing an example of a configuration of a network system in a second embodiment.

FIG. 5 is a diagram showing an example of a configuration of a network system 100b. The network system 100b (a relay transmission system) includes an OLT 11 (a relay transmission device), an optical splitter 12, ONUS 13-1 to 13-5 (optical network units), mobile wireless terminals 21-1 to 21-2, RRHs 22-1 to 22-3 (wireless communication systems), a BBU 23, a mobile NW 24 (a mobile network), another communication system 31, another communication system 32, a layer 2 switch (L2SW 33), another service NW 34 (another service network), an optical fiber 41, and optical fibers 42-1 to 42-4.

The ONU 13-5 is connected to the RRH 22-3 in one-to-one correspondence. In the second embodiment, the ONU 13-5 transmits an uplink signal of the RRH 22-3 to the OLT 11 via the optical fiber 42-3 and the optical splitter 12. The ONU 13-5 acquires a downlink signal for the RRH 22-3 from the OLT 11 via the optical splitter 12 and the optical fiber 42-3. The OLT 11 relays a signal transmitted between the RRH 22-3 and the BBU 23. The OLT 11 accommodates a communication line between the RRH 22-3 and the BBU 23.

In the second embodiment, the RRH 22-1 and the RRH 22-2 belong to different groups. That is, in the second embodiment, the configuration of the TDD subframe of the ONU 13-1 is different from the configuration of the TDD subframe of the ONU 13-2. In the second embodiment, the RRH 22-2 and the RRH 22-3 belong to the same group. That is, in the second embodiment, the configuration of the TDD subframe of the ONU 13-2 and the configuration of the TDD subframe of the ONU 13-5 are the same.

The configuration of the TDD subframe in the ONU 13-1 and the RRH 22-1 is the configuration of the TDD subframe indicated by an index "0" shown in FIG. 10. The configuration of the TDD subframe in the ONU 13-2 and the RRH 22-2 is the configuration of the TDD subframe indicated by an index "2" shown in FIG. 10. The configuration of the TDD subframe in the ONU 13-3 and the RRH 22-3 is the configuration of the TDD subframe indicated by the index "2" shown in FIG. 10. In the configuration example shown in FIG. 5, the number of groups of ONUs 13 having the same TDD subframe configuration is 2.

Figure 6:
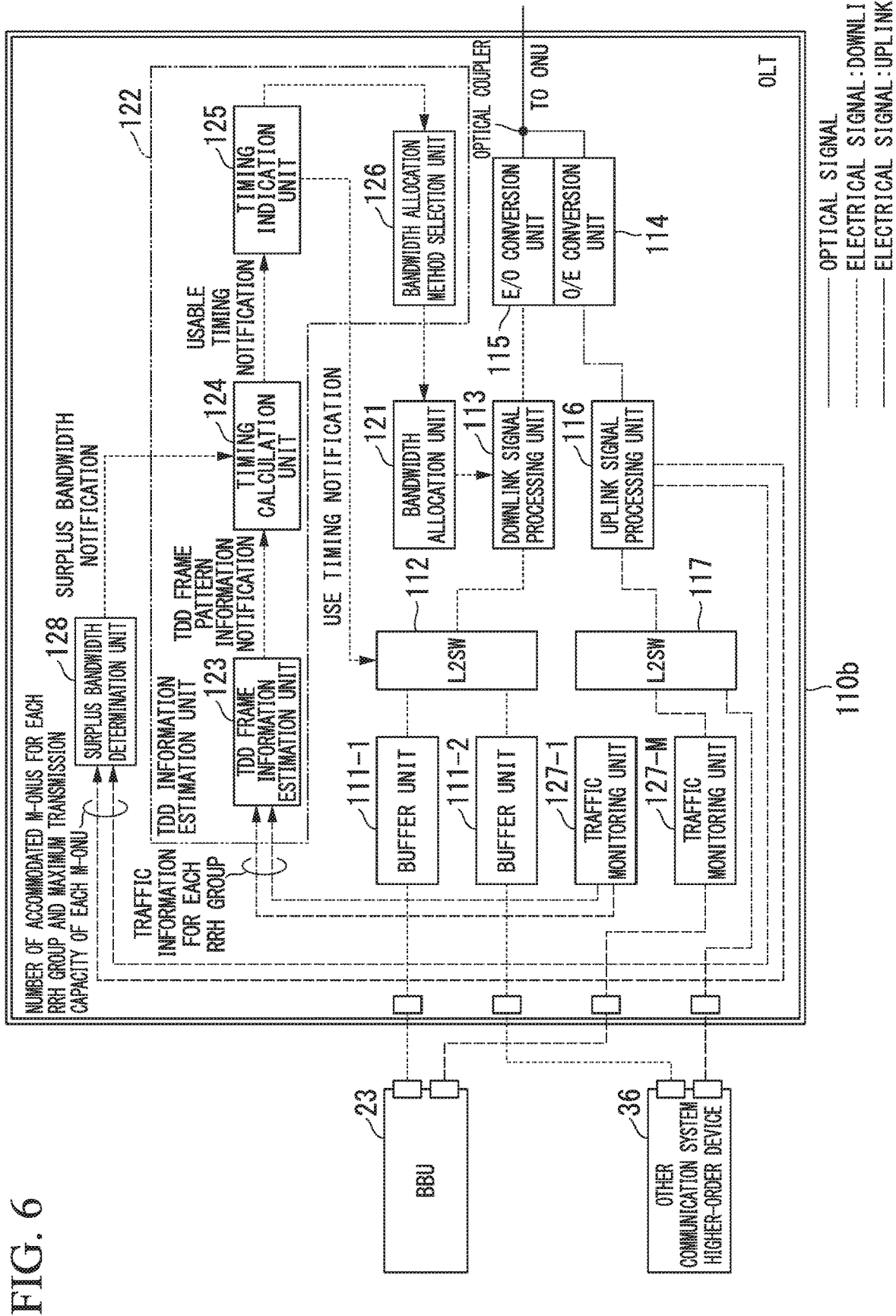
FIG. 6 is a block diagram showing an example of a configuration of an OLT in the second embodiment.

FIG. 6 is a block diagram showing an example of the configuration of the OLT 110b. The OLT 110b is the OLT 11 shown in FIG. 5. Also, the OLT 110b may be an external device connected to the OLT 11.

The OLT 110b includes a buffer unit 111-1, a buffer unit 111-2, an L2SW 112, a downlink signal processing unit 113, an O/E conversion unit 114, an E/O conversion unit 115, an uplink signal processing unit 116, an L2SW 117, a bandwidth allocation unit 121, and a TDD information estimation unit 122. The TDD information estimation unit 122 includes a TDD frame information estimation unit 123, a timing calculation unit 124, a timing indication unit 125, a bandwidth allocation method selection unit 126, traffic monitoring units 127-1 to 127-M, and a surplus bandwidth determination unit 128. M is the number of groups indicating the classification of the RRH 22. In FIG. 5, M=2. The group indicating the classification of the RRH 22 may be a group indicating the classification of the wireless communication system including the RRH 22. The group of the RRH 22 may be a group indicating the classification of the ONU 13 communicating with the RRH 22.

A traffic monitoring unit 127-m monitors traffic of the RRH 22 belonging to group m, where m is any one of 1 to M. That is, the traffic monitoring unit 127-m transmits an uplink signal of the RRH 22 belonging to group m to the TDD frame information estimation unit 123. Hereinafter, when common items of the traffic monitoring units 127-1 to 127-M are described, a part of the reference sign will be omitted and the traffic monitoring units 127-1 to 127-M will be referred to as a "traffic monitoring unit 127."

The TDD frame information estimation unit 123 estimates TDD frame pattern information indicating the configuration of the TDD subframe of the RRH 22 belonging to group m on the basis of the uplink signal of the RRH 22 belonging to group m. That is, the TDD frame information estimation unit 123 estimates the TDD frame pattern information for each group of the wireless communication system on the basis of traffic information of each group of the wireless communication system.

The uplink signal processing unit 116 estimates the maximum transmission capacity of each ONU 13 of the wireless communication system (the maximum transmission capacity of each M-ONU) for each group of the wireless communication system. The uplink signal processing unit 116 transmits information indicating the maximum transmission capacity of each ONU 13 of the wireless communication system to the surplus bandwidth determination unit 128 for each group of the wireless communication system. The uplink signal processing unit 116 transmits information indicating the number of ONUs 13 (the number of accommodated M-ONUs) connected to the OLT 110b and the wireless communication system to the surplus bandwidth determination unit 128 for each group of the wireless communication system.

The surplus bandwidth determination unit 128 acquires information indicating the maximum transmission capacity of each ONU 13 of the wireless communication system (the maximum transmission capacity of each M-ONU) from the uplink signal processing unit 116 for each group of the wireless communication system. The surplus bandwidth determination unit 128 may acquire information indicating the maximum transmission capacity of each ONU 13 of the wireless communication system (the maximum transmission capacity of each M-ONU) from the downlink signal processing unit 113 for each group of the wireless communication system.

The surplus bandwidth determination unit 128 acquires information indicating the number of ONUs 13 connected to the OLT 110b and the wireless communication system (the number of accommodated M-ONUs) from the uplink signal processing unit 116 for each group of the wireless communication system. The surplus bandwidth determination unit 128 may acquire information indicating the number of ONUs 13 connected to the OLT 110b and the wireless communication system (the number of accommodated M-ONUs) from the downlink signal processing unit 113 for each group of the wireless communication system.

The surplus bandwidth determination unit 128 determines a surplus bandwidth for each group of the wireless communication system on the basis of the maximum transmission capacity of each ONU 13 of the wireless communication system and the number of ONUs 13 connected to the OLT 110b and the wireless communication system. That is, the surplus bandwidth determination unit 128 determines a surplus bandwidth for each group of the RRH 22 on the basis of the maximum transmission capacity of each ONU 13 of the wireless communication system and the number of ONUs 13 connected to the OLT 110b and the wireless communication system.

On the basis of the TDD frame pattern information for each group of the wireless communication system, the timing calculation unit 124 determines a TDD transmission period for each group of the wireless communication system. The timing calculation unit 124 determines a period other than the TDD transmission period as a TDD non-transmission period for each group of the wireless communication system.

Figure 7:
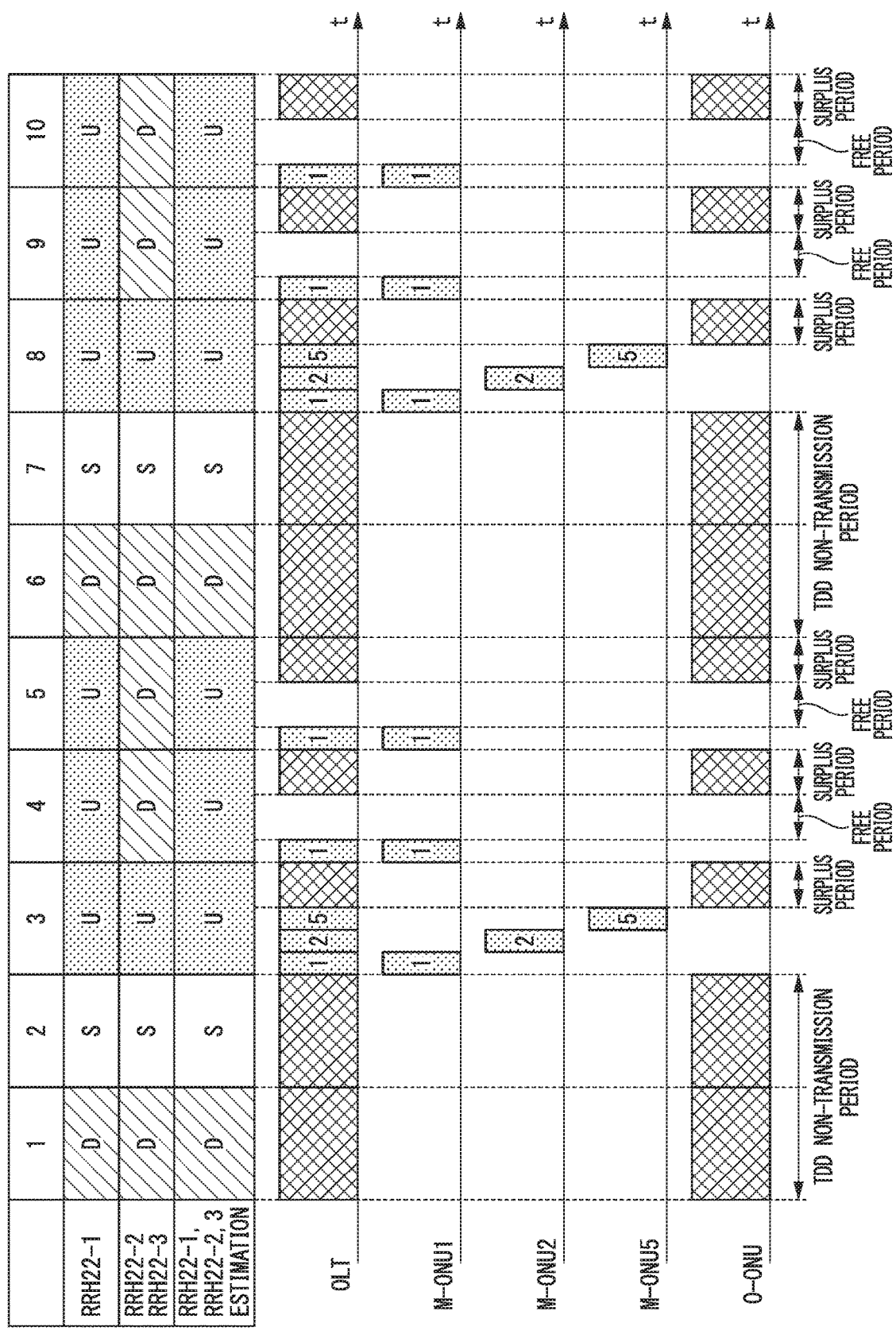
FIG. 7 is a time chart showing a second example of traffic in a comparative example.

FIG. 7 is a time chart showing a second example of traffic in the comparative example. FIG. 7 is a time chart for comparison with FIG. 8. FIG. 7 is a time chart showing an example of traffic when it is assumed that the OLT 110b does not distinguish groups of RRHs 22 (groups of wireless communication systems) as in the first embodiment.

In FIG. 7, the horizontal axis represents time. M-ONU 1 shown in FIG. 7 is the ONU 13-1 shown in FIG. 5. M-ONU 2 shown in FIG. 7 is the ONU 13-2 shown in FIG. 5. M-ONU 5 shown in FIG. 7 is the ONU 13-5 shown in FIG. 5. An O-ONU shown in FIG. 7 includes the ONU 13-3 and the ONU 13-4 shown in FIG. 5.

A first row from the top shows a subframe number shown in FIG. 10. A second row from the top shows a type of TDD subframe allocated to a signal of the RRH 22-1. A configuration of the TDD frame indicated by an index "0" in FIG. 10 is allocated to the RRH 22-1. A third row from the top shows types of TDD subframes allocated to signals of the RRHs 22-2 and 22-3. A configuration of the TDD frame indicated by an index "2" in FIG. 10 is allocated to the RRHs 22-2 and 22-3. A fourth row from the top shows results of estimating types of TDD subframes allocated to the signals of the RRHs 22-1 to 22-3.

A fifth row from the top shows a timing at which the OLT 110a acquires a signal. A sixth row from the top shows a timing at which the ONU 13-1 (M-ONU 1) transmits a signal. A seventh row from the top shows a timing at which the ONU 13-2 (M-ONU 2) transmits a signal. An eighth row from the top shows a timing at which the ONU 13-5 (M-ONU 5) transmits a signal. A ninth row from the top shows a timing at which the ONU 13-3 or the ONU 13-4 (an O-ONU) transmits a signal.

If groups of RRHs 22 are not distinguished, the TDD frame information estimation unit 123 determines the configuration of the TDD subframe of the RRH 22-1 as the configurations of the TDD subframes of the RRHs 22-1 to 22-3. Therefore, the timing calculation unit 124 integrates the RRHs 22-1 to 22-3 and determines surplus periods of the RRHs 22-1 to 22-3. That is, the timing calculation unit 124 determines a period during which any of the RRHs 22-1 to 22-3 transmits the uplink signal as a TDD transmission period common to all the RRHs 22 (the RRHs 22-1 to 22-3).

In the example shown in FIG. 7, because the TDD frame information estimation unit 123 does not distinguish the groups of the RRHs 22, the indices of the TDD frames of the RRHs 22-2 and 22-3 are estimated to be the same as the index "0" of the TDD frame of the RRH 22-1. Thereby, a free period occurs in the TDD subframe having subframe numbers 4, 5, 9, and 10.

Figure 8:
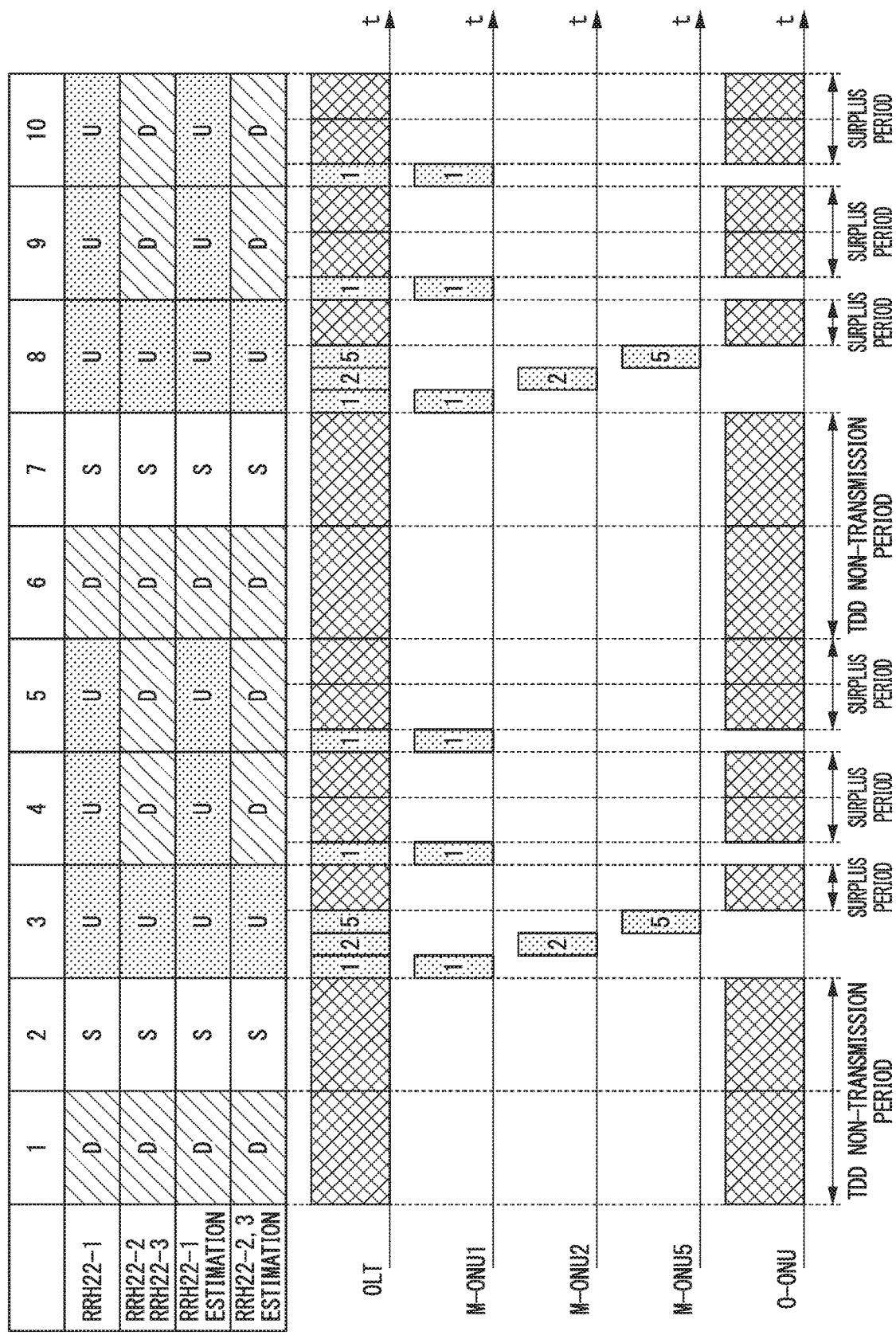
FIG. 8 is a time chart showing a third example of traffic in the second embodiment.

FIG. 8 is a time chart showing a third example of traffic in the second embodiment. In the example shown in FIG. 8, a case in which the OLT 110b distinguishes groups of RRHs 22 (groups of wireless communication systems) is shown.

In FIG. 8, the horizontal axis represents time. M-ONU 1 shown in FIG. 8 is the ONU 13-1 shown in FIG. 5. M-ONU 2 shown in FIG. 8 is the ONU 13-2 shown in FIG. 5. M-ONU 5 shown in FIG. 8 is the ONU 13-5 shown in FIG. 5. An O-ONU shown in FIG. 8 includes the ONU 13-3 and the ONU 13-4 shown in FIG. 5.

A first row from the top shows a subframe number shown in FIG. 10. A second row from the top shows a type of TDD subframe allocated to a signal of the RRH 22-1. A configuration of the TDD frame indicated by an index "0" in FIG. 10 is allocated to the RRH 22-1. A third row from the top shows types of TDD subframes allocated to signals of the RRHs 22-2 and 22-3. A configuration of the TDD frame indicated by an index "2" in FIG. 10 is allocated to the RRHs 22-2 and 22-3. A fourth row from the top shows a result of estimating a type of TDD subframe allocated to the signal of the RRH 22-1. A fifth row from the top shows results of estimating types of TDD subframes allocated to the signals of the RRHs 22-2 and 22-3.

A sixth row from the top shows a timing at which the OLT 110a acquires a signal. A seventh row from the top shows a timing at which the ONU 13-1 (M-ONU 1) transmits a signal. An eighth row from the top shows a timing at which the ONU 13-2 (M-ONU 2) transmits a signal. A ninth row from the top shows a timing at which the ONU 13-5

(M-ONU 5) transmits a signal. A tenth row from the top shows a timing at which the ONU 13-3 or the ONU 13-4 (the O-ONU) transmits a signal.

The TDD frame information estimation unit 123 distinguishes configurations of TDD frames allocated to groups of RRHs 22 on the basis of traffic information acquired from the traffic monitoring unit 127 provided for each group of the RRH 22. The timing calculation unit 124 determines a surplus period of the RRH 22-1. The timing calculation unit 124 determines surplus periods of the RRH 22-2 and the RRH 22-3. To distinguish the groups of the RRHs 22, the TDD frame information estimation unit 123 estimates an index indicating the configuration of the TDD frame for the RRH 22-1 as "0." To distinguish the groups of the RRHs 22, the TDD frame information estimation unit 123 estimates indexes indicating configurations of TDD frames for the RRHs 22-2 and 22-3 as "2." That is, the OLT 110b estimates the configuration of the TDD frame for each group of the RRH 22.

The OLT 110b can calculate a bandwidth allocated to an uplink signal of the wireless communication system on the basis of a result of estimating a configuration of the TDD frame of each group and the number of RRHs 22 belonging to each group. In addition, the OLT 110b can calculate a surplus bandwidth in each of the TTD subframes. Even when the configuration of the TDD frame in each group is different, the OLT 110b can allocate the uplink signal of the other communication system to the surplus bandwidth without causing a free period to occur. Thereby, the OLT 110b can improve the bandwidth utilization efficiency.

As described above, the network system 100b of the second embodiment is a relay transmission system which accommodates a communication line of a wireless communication system including RRHs 22 for performing communication according to TDD and a communication line of another communication system different from the wireless communication system. The network system 100b includes a relay unit, a TDD information estimation unit 122, a surplus bandwidth determination unit 128, a bandwidth allocation unit 121, an ONU 13-3 (a communication device), and an ONU 13-4 (a communication device). The relay unit relays an uplink signal and a downlink signal of the wireless communication system. The TDD information estimation unit 122 estimates a timing of the TDD transmission period on the basis of a signal that is relayed by the relay unit. The surplus bandwidth determination unit 128 determines a surplus bandwidth for each group determined on the basis of a subframe of the wireless communication system, on the basis of the number of RRHs 22 of the wireless communication system or the number of ONUs 13 connected to the wireless communication system and the maximum transmission capacity of the RRH 22 of the wireless communication system or the maximum transmission capacity of the ONU 13 connected to the wireless communication system. The bandwidth allocation unit 121 allocates a surplus bandwidth for each group to the uplink signal of the other communication system. The ONU 13-3 and the ONU 13-4 transmit uplink signals of the wireless communication system on the basis of the bandwidth allocation by the bandwidth allocation unit 121.

Thereby, the network system 100b of the second embodiment (a relay transmission system) can improve the bandwidth utilization efficiency regardless of the number of ONUs 13 connected to the OLT 110b and the wireless communication system and a group thereof. That is, the network system 100b of the second embodiment can improve the bandwidth utilization efficiency regardless of the number of ONUs 13 connected to the OLT 110b and the wireless communication system and the index of the TDD frame for each wireless communication system.

In FIG. 5, if there is no ONU 13 connected to the OLT 11 and the wireless communication system, i.e., if ONUs 13-1, 13-2, and 13-5 are absent, the OLT 110b serving as the OLT 11 may allocate all bandwidths in the optical section to the other communication system.

Also, the traffic monitoring unit 127 shown in FIG. 2 or 6 may monitor the traffic of the downlink signal of the wireless communication system. For example, the traffic monitoring unit 127 may transmit the downlink signal of the wireless communication system to the TDD frame information estimation unit 123. The traffic monitoring unit 127 shown in FIG. 2 or 6 may monitor traffic of at least one of uplink and downlink signals of the wireless communication system. For example, the traffic monitoring unit 127 may transmit at least one of uplink and downlink signals of the wireless communication system to the TDD frame information estimation unit 123 as traffic information.

Also, if the number of ONUs connected to the wireless communication system increases or decreases, the uplink signal processing unit 116 may update information indicating the number of ONUs 13 connected to the OLT 110a and the wireless communication system (the number of accommodated M-ONUs) and transmit information indicating the updated number of ONUs 13 to the surplus bandwidth determination unit 128. On the basis of the updated number of ONUs 13 connected to the OLT 110a and the wireless communication system and the maximum transmission capacity of each ONU 13 of the wireless communication system (the maximum transmission capacity of each M-ONU), the surplus bandwidth determination unit 128 may determine a surplus bandwidth. Also, in the network systems 100a and 100b, the L2SW 33 and the OLT 11 may be configured as one device.

At least some of the functions of the relay transmission system and the relay transmission device in the above-described embodiment may be implemented by a computer. In this case, the functions may be implemented by recording a program for implementing the functions on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a storage device including a flexible disk, a magneto-optical disc, a read only memory (ROM), a portable medium such as a compact disc (CD)-ROM, and a hard disk embedded in the computer system. Further, the "computer-readable recording medium" is assumed to include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. Also, the above-described program may be used to implement some of the above-described functions. Further, the program may implement the above-described functions in combination with a program already recorded on the computer system or may be implemented using a programmable logic device such as a field programmable gate array (FPGA).

Although embodiments of the present invention have been described above with reference to the drawings, specific configurations are not limited to the embodiments, and design changes, and so on, may also be included without departing from the scope of the present invention.

INDUSTRIAL APPLICABILITY

The present invention can also be applied to a field of application for improving bandwidth utilization efficiency in a system configured to accommodate a communication line of a first communication system for performing communication according to TDD and a communication line of a second communication system.

REFERENCE SIGNS LIST

11 OLT
12 Optical splitter
13 ONU
21 Mobile wireless terminal
22 RRH
23 BBU
24 Mobile NW
31 Other communication system
32 Other communication system
33 Layer 2 switch (L2SW)
34 Other service NW
36 Other communication system higher-order device
41 Optical fiber
42 Optical fiber
100a Network system
100b Network system
110a OLT
110b OLT
111 Buffer unit (relay unit)
112 L2SW (relay unit)
113 Downlink signal processing unit (relay unit)
114 O/E conversion unit (relay unit)
115 E/O conversion unit (relay unit)
116 Uplink signal processing unit (relay unit)
117 L2SW (relay unit)
121 Bandwidth allocation unit
122 TDD information estimation unit
123 TDD frame information estimation unit
124 Timing calculation unit
125 Timing indication unit
126 Bandwidth allocation method selection unit
127 Traffic monitoring unit
128 Surplus bandwidth determination unit

The invention claimed is:

1. A relay transmission system, which accommodates a communication line of a first communication system including a plurality of network devices for performing communication according to time division duplex (TDD) and a communication line of a second communication system, the relay transmission system comprising:
   a relay unit configured to relay uplink signals and downlink signals in the first and second communication systems;
   a TDD information estimation unit configured to estimate a transmission period of the plurality of network devices in the first communication system on a basis of the uplink or downlink signal of the first communication system that is relayed by the relay unit;
   a surplus bandwidth determination unit configured to determine a surplus bandwidth in which an uplink signal of the first communication system is not allocated to the relay unit during the transmission period on a basis of a number of the plurality of network devices and a maximum transmission capacity of the plurality of network devices; and
   a bandwidth allocation unit configured to allocate an uplink signal of the second communication system to the relay unit in the surplus bandwidth,
   wherein each of the relay unit, the TDD information estimation unit, the surplus bandwidth determination unit and the bandwidth allocation unit is implemented by:
      i) computer executable instructions executed by at least one computer processor or
      ii) at least one circuitry.

2. The relay transmission system according to claim 1, wherein the plurality of network devices perform communication according to combinations of a downlink subframe and an uplink subframe allocated to subframes included in a TDD frame,
   wherein the plurality of network devices are classified into groups corresponding to the combinations,
   wherein the TDD information estimation unit is further configured to estimate the transmission period for each of the groups on a basis of the uplink or downlink signal of the first communication system that is relayed by the relay unit, and
   wherein the surplus bandwidth determination unit is further configured to determine the surplus bandwidth on a basis of a number of network devices of each of the groups and a maximum transmission capacity of the plurality of network devices.

3. A relay transmission method for use in a relay transmission system, which accommodates a communication line of a first communication system including a plurality of network devices for performing communication according to TDD and a communication line of a second communication system, the relay transmission method comprising the steps of:
   relaying uplink signals and downlink signals in the first and second communication systems;
   estimating a transmission period of the plurality of network devices in the first communication system on a basis of the relayed uplink or downlink signal of the first communication system;
   determining a surplus bandwidth in which an uplink signal of the first communication system is not allocated during the transmission period on a basis of a number of the plurality of network devices and a maximum transmission capacity of the plurality of network devices; and
   allocating an uplink signal of the second communication system in the surplus bandwidth.

4. A relay transmission device, which accommodates a communication line of a first communication system including a plurality of network devices for performing communication according to TDD and a communication line of a second communication system, the relay transmission device comprising:
   a relay unit configured to relay uplink signals and downlink signals in the first and second communication systems;
   a TDD information estimation unit configured to estimate a transmission period of the plurality of network devices in the first communication system on a basis of the uplink or downlink signal of the first communication system that is relayed by the relay unit;
   a surplus bandwidth determination unit configured to determine a surplus bandwidth in which an uplink signal of the first communication system is not allocated to the relay unit during the transmission period on a basis of a number of the plurality of network devices and a maximum transmission capacity of the plurality of network devices; and
a bandwidth allocation unit configured to allocate an uplink signal of the second communication system to the relay unit in the surplus bandwidth
wherein each of the relay unit, the TDD information estimation unit, the surplus bandwidth determination unit and the bandwidth allocation unit is implemented by:
  i) computer executable instructions executed by at least one computer processor or
  ii) at least one circuity.

\* \* \* \* \*